US009792689B2

(12) United States Patent
Shiozaki et al.

(10) Patent No.: US 9,792,689 B2
(45) Date of Patent: Oct. 17, 2017

(54) POSTURE ESTIMATING APPARATUS, POSTURE ESTIMATING METHOD AND STORING MEDIUM

(71) Applicant: CANON KABUSHIKI KAISHA, Tokyo (JP)

(72) Inventors: Hiromi Shiozaki, Yokohama (JP); Yuki Saito, Yokohama (JP); Atsushi Nogami, Tokyo (JP); Masakazu Matsugu, Yokohama (JP); Kenji Tsukamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 178 days.

(21) Appl. No.: 14/340,636

(22) Filed: Jul. 25, 2014

(65) Prior Publication Data
US 2015/0036879 A1 Feb. 5, 2015

(30) Foreign Application Priority Data

Jul. 30, 2013 (JP) .................. 2013-157974
Feb. 12, 2014 (JP) .................. 2014-024716
May 9, 2014 (JP) .................. 2014-097829

(51) Int. Cl.
G06K 9/00 (2006.01)
G06T 7/00 (2017.01)
G06T 7/73 (2017.01)

(52) U.S. Cl.
CPC ........ G06T 7/0046 (2013.01); G06K 9/00369 (2013.01); G06T 7/75 (2017.01);
(Continued)

(58) Field of Classification Search
CPC ............ G06K 9/00369; G06K 9/00342; G06T 7/0046
See application file for complete search history.

(56) References Cited

U.S. PATENT DOCUMENTS 5,892,691 A * 4/1999 Fowler .................... G06T 19/20
345/619
8,351,646 B2 * 1/2013 Fujimura ........... G06K 9/00214
382/103
(Continued)

FOREIGN PATENT DOCUMENTS

JP H10-124677 A 5/1998

OTHER PUBLICATIONS

Jamie Shotton, et. al., "Real-Time Human Pose Recognition in Parts from Single Depth Images", IEEE Computer Vision and Pattern Recognition, 2011, pp. 1-8.
(Continued)

Primary Examiner — Bhavesh Mehta
Assistant Examiner — Ian Lemieux
(74) Attorney, Agent, or Firm — Carter, DeLuca, Farrell & Schmidt, LLP

(57) ABSTRACT

The present invention aims to estimate a more consistent posture in regard to a multi-joint object. A target range image is first input, a human body region is extracted from the input range image, a target joint position candidate is calculated from the input range image, and a joint position is finally determined based on the calculated joint position candidate and a likelihood of each joint to estimate the posture. At this time, joint position permissible range information concerning inter-joint distance and angle of a human body model previously set by learning is obtained from a human body model storing unit, consistency is evaluated for a relation between the joint position candidates of a certain joint and other joint based on the obtained information, and thus the posture corresponding to the best combination of the joint positions is determined.

25 Claims, 10 Drawing Sheets

(52) U.S. Cl.
CPC ............... *G06T 2207/10028* (2013.01); *G06T 2207/20076* (2013.01); *G06T 2207/20081* (2013.01); *G06T 2207/30196* (2013.01)

(56) References Cited

U.S. PATENT DOCUMENTS

| | | | | |
|---|---|---|---|---|
| 2011/0267344 | A1* | 11/2011 | Germann | G06K 9/00201 345/420 |
| 2012/0020523 | A1* | 1/2012 | Ikeda | G01B 11/005 382/103 |
| 2012/0056800 | A1* | 3/2012 | Williams | G06F 3/011 345/156 |
| 2012/0148102 | A1* | 6/2012 | Moriguchi | G06T 7/208 382/103 |

OTHER PUBLICATIONS

Ross Girshick, et. al., "Efficient Regression of General-Activity Human Poses from Depth Images", IEEE International Conference on Computer Vision, 2011, pp. 1-8.

\* cited by examiner

| JOINTS | JOINT POSITION CANDIDATES |
|---|---|
| $J_1$ | (x1_1, y1_1, z1_1, l1_1) (x1_2, y1_2, z1_2, l1_2) |
| $J_2$ | (x2_1, y2_1, z2_1, l2_1) (x2_2, y2_2, z2_2, l2_2) (x2_3, y2_3, z2_3, l2_3) (x2_4, y2_4, z2_4, l2_4) |
| $J_3$ | (x3_1, y3_1, z3_1, l3_1) (x3_2, y3_2, z3_2, l3_2) (x3_3, y3_3, z3_3, l3_3) |
| ⋮ | ⋮ |

| RATIO OF INTER-JOINT DISTANCES | EVALUATION EXPRESSION |
|---|---|
| $r_1$ | $\dfrac{\|\|J_{12} - J_{11}\|\|}{\|\|J_{13} - J_{12}\|\|}$ |
| $r_2$ | $\dfrac{\|\|J_{15} - J_{14}\|\|}{\|\|J_{16} - J_{15}\|\|}$ |
| $r_3$ | $\dfrac{\|\|J_6 - J_5\|\|}{\|\|J_7 - J_6\|\|}$ |
| $r_4$ | $\dfrac{\|\|J_9 - J_8\|\|}{\|\|J_{10} - J_9\|\|}$ |
| $r_5$ | $\dfrac{\|\|J_{12} - J_{11}\|\| + \|\|J_{13} - J_{12}\|\|}{\|\|J_3 - J_2\|\| + \|\|J_4 - J_3\|\|}$ |
| $r_6$ | $\dfrac{\|\|J_{12} - J_{11}\|\| + \|\|J_{13} - J_{12}\|\|}{\|\|J_3 - J_2\|\| + \|\|J_4 - J_3\|\|}$ |
| ⋮ | ⋮ |

POSTURE ESTIMATING APPARATUS, POSTURE ESTIMATING METHOD AND STORING MEDIUM

BACKGROUND OF THE INVENTION

Field of the Invention

The present invention relates to a posture estimating apparatus and a posture estimating method which are suitable for estimating a posture (or a pose) of a multi-joint object, and a storing medium which stores programs for the posture estimating apparatus and method.

Description of the Related Art

As typical methods of estimating a posture of an object in an image, there are a method of obtaining a kind of posture by using a discriminator, and a method (fitting) of comparing an image and a temporary posture with each other and then gradually modifying the temporary posture so as to reduce a difference therebetween. More specifically, as the method of obtaining the kind of posture by using the discriminator, there is a method of determining a whole posture by utilizing one or more local features. Incidentally, Japanese Patent Application Laid-Open No. H10-124677 discloses a method of sequentially selecting each two partial shapes of a target, sorting out posture candidates based on an arrangement relation of the selected partial shapes, and then determining the final posture candidate. Moreover, as a method of obtaining a posture of an object, there may be a method of uniquely determining the posture based on a mutual relation between a plurality of local features included in a certain posture of the target and the relevant posture.

However, the method as described in Japanese Patent Application Laid-Open No. H10-124677 of narrowing the posture candidates by utilizing the arrangement relation of the local features premises that the arrangement relation of the local features is fixed. Consequently, the relevant method can be applied to a rigid body of which the shape has previously been decided but cannot be applied to an object of which the shape is highly changed. In addition, the method of uniquely determining, as the possible posture of the object, the posture from a previously set model or the like is advantageous in the respect that the posture possible as the object can surely be obtained. However, in the relevant method, since the whole posture is uniquely determined in disregard of local portions, consistency of the posture including the local portions is insufficient.

The posture estimating apparatus according to the specification of this application has been completed in consideration of such problems as described above, and aims to be able to estimate a more consistent posture in regard to a multi-joint object.

SUMMARY OF THE INVENTION

A posture estimating apparatus according to the specification of this application is characterized by comprising: an inputting unit configured to input a range image including a multi-joint object; a deriving unit configured to derive at least one joint position candidate for each of a plurality of joint positions of the object, from the range image input by the inputting unit; a storing unit configured to store information including a positional relation between a joint in a multi-joint object model corresponding to the object and other joint; and an estimating unit configured to estimate a posture of the object on the basis of the information including the positional relation and the derived joint position candidate.

Further features of the present invention will become apparent from the following description of exemplary embodiments with reference to the attached drawings.

DESCRIPTION OF THE EMBODIMENTS

Preferred Embodiments of the Present Invention will now be described in detail in accordance with the accompanying drawings.

First Embodiment

The present embodiment is directed to an example that a range image (or a distance image) is first obtained from a distance imaging apparatus, a joint position candidate of a human body included in the obtained range image is estimated, consistency of an arrangement of joint positions corresponding to the joint position candidates, that is, whether or not the arrangement is a possible arrangement as a human body is evaluated, and then a final posture is estimated. In the following descriptions, estimation of the posture shall be equivalent to estimation of the joint position of the human body. In this regard, the joint position to be obtained shall include not only a two-dimensional position but also a three-dimensional position. Although the example of estimating the posture of the human body will be described in the following embodiments, it is needless to say that the present invention is applicable not only to the human body but also to other object having a joint, joints, an articulation or articulations.

<Constitution and Outline>

Figure 1:
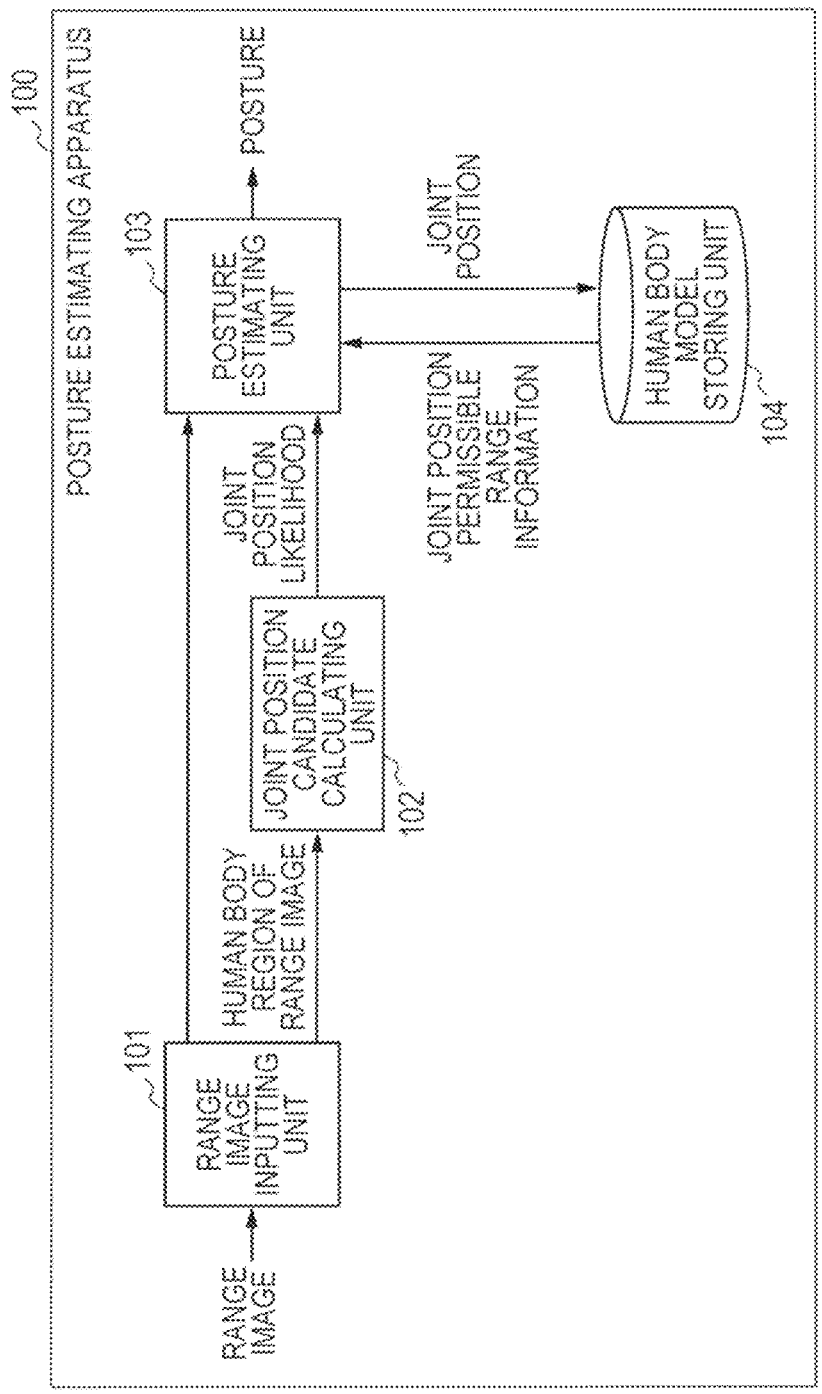
FIG. 1 is a block diagram illustrating a constitutional example of a posture estimating apparatus according to an embodiment of the present invention.

FIG. 1 is a block diagram illustrating a constitutional example of a posture estimating apparatus 100 according to an embodiment of the present invention.

The posture estimating apparatus 100 illustrated in FIG. 1 is equipped with a range image inputting unit 101, a joint position candidate calculating unit 102, a posture estimating unit 103 and a human body model storing unit 104. Here, it should be noted that it is possible to achieve the posture estimating apparatus 100 by causing a calculator constituted by a CPU (central processing unit), a memory, a storage device, an inputting/outputting device, a bus, a display and the like to execute software (programs) obtained by a network or various recording media. Moreover, it should be noted that it is also possible to use hardware designed optimally for the software.

Figure 2:
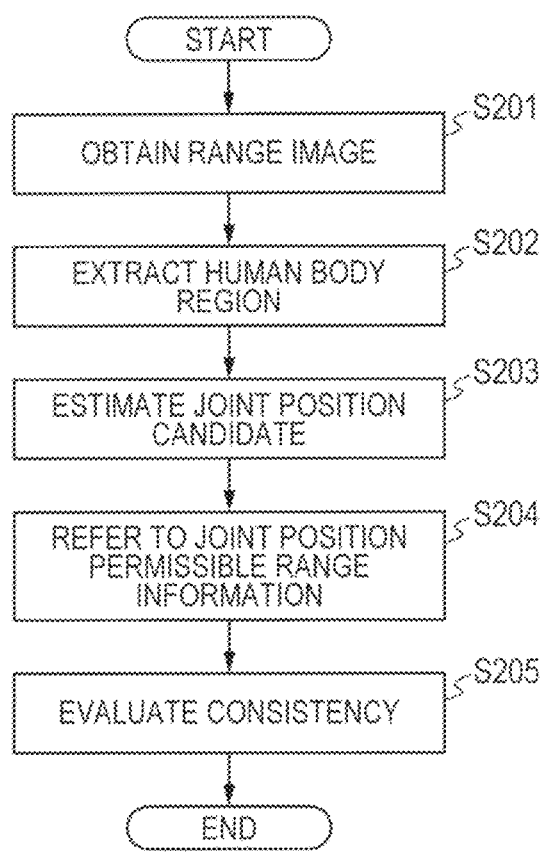
FIG. 2 is a flow chart for describing an example of a processing procedure to be performed by the posture estimating apparatus according to the embodiment of the present invention.

FIG. 2 is a flow chart for describing an example of a processing procedure to be performed by the posture estimating apparatus 100 according to the present embodiment. Hereinafter, the basic process of the present embodiment will be described with reference to FIGS. 1 and 2. Incidentally, detailed processes will later be described respectively.

The range image inputting unit 101 illustrated in FIG. 1, which is equivalent to the constitution of inputting a range image to be processed, performs, for example, the processes in S201 and S202 illustrated in FIG. 2. Here, the range image is an image in which depth-direction distance information is recorded with a predetermined scaling for each pixel thereof, and the range image may be created by CG (computer graphics) technique or the like. In S201, the range image inputting unit 101 obtains the range image from the distance imaging apparatus. Incidentally, the range image to be processed may be input to the range image inputting unit 101 from a not-illustrated recording apparatus in which imaged range images have previously been recorded and stored. Also, the range image inputting unit 101 performs in S202 a process of extracting a human body region from the range image.

The joint position candidate calculating unit 102, which is equivalent to the constitution of calculating a joint position candidate of a target from the range image, performs, for example, the process in S203 illustrated in FIG. 2. More specifically, in this process, it is first discriminated by using a partial region discriminator to which of learned partial regions each portion of the human body region of the range image corresponds, and then the joint position candidate is calculated from the correlation between the discriminated portion and the joint position, i.e., a relative vector, a distance, a direction and the like. Otherwise, by using a plurality of detectors such as a head detector, a trunk detector, a hand detector, a leg detector and the like, the parts corresponding to the respective detectors are detected in the human body region of the range image, and then the joint position candidate may be calculated from the correlation between each of the detected parts and the joint position. Moreover, the joint position can be estimated from the feature of the partial region. In any case, the method of calculating the joint position candidate is not specifically limited to such methods as described above.

The posture estimating unit 103, which is equivalent to the constitution of determining a final joint position and thus estimating the posture based on the joint position candidate of each joint and its likelihood, performs, for example, the processes in S204 and S205 in FIG. 2. In S204, the posture estimating unit 103 estimates a human body model similar to the target human body, and obtains the joint position permissible range information of the estimated human body model from the human body model storing unit 104. Then, in S205, the posture estimating unit evaluates the consistency for the relation between the joint position candidate of a certain joint and the joint position candidate of other joint, based on the joint position permissible range information. The above processes are repeatedly performed, also the likelihood of the joint position candidate is considered, and thus the posture corresponding to the best combination of the joint positions is determined.

In the human body model storing unit 104, joint information such as a distance, an angle and the like between the joints of the human body model previously set by learning has previously been stored as the joint position permissible range information, so that the joint position permissible range information of the designated joint can be referred. Incidentally, in a case where the target is not the human body, the joint position permissible range information indicating a joint position arrangement relation of a multi-joint object model has been stored likewise. Besides, the joint position permissible range information may be held for each human body model (or each multi-joint object model), held for each classification based on a height, a figure or the like, or held as one information for all the models.

<Detail of Process>

Subsequently, each of the processes will be described in detail.

<Extraction of Human Body Region>

As described above, the range image inputting unit 101 obtains the range image for the posture estimation, and extracts the human body region from the obtained range image as a pre-process. In the relevant human body region extracting process, a background difference process is first performed to the range image to extract only foreground candidate pixels. Subsequently, the distance values of the foreground candidate pixels are converted into point groups of a camera coordinate system (i.e., a three-dimensional coordinate system). Then, the center position of the group of the point groups of the three-dimensional coordinate system is obtained, and, among the point groups around the center position, the points existing in the range held in the human body size are set as the human body region. At this time, the human body size can be determined by using previously learned average and maximum sizes of the human body.

With respect to the grounding portion between the human body and a floor, plane estimation or the like is performed to determine the boundary between the human body and the floor, so that it is possible to determine the human body region. Then, the point groups labelled as the human body region are again projected onto the image plane, so that it is possible to obtain the range image from which the human body region has been extracted. Incidentally, it should be noted that the human body region extracting process is not limited to this but may be achieved by a known method.

<Calculation of Joint Position Candidate>

Next, a concrete method of calculating the joint position candidate from the range image by the joint position candidate calculating unit 102 will be described.

First, the method of calculating the joint position candidate by using a partial region discriminator will be described. The partial region discriminator discriminates a partial region for the human body region of the range image. Here, the partial region may be discriminated by using the existing method as described in, e.g., Jamie Shotton, "Real-Time Human Pose Recognition in Parts from Single Depth Images", IEEE Computer Vision and Pattern Recognition, 2011. More specifically, two-point comparison of the range image is used for a feature amount, and the partial region is discriminated for each pixel by using a decision tree for the discriminator. However, the present embodiment is not limited to this method. For example, it is conceivable to use an HOG (Histograms of Oriented Gradients) feature amount, an Edglet feature amount or the like as the feature amount. Moreover, it is conceivable to use an SVM (Support Vector Machine) or the like as the discriminator. In that case, it is possible to calculate a likelihood by using the distance from a discrimination boundary (hyperplane).

The joint position candidate is calculated from the partial region thus discriminated. Here, it is possible to obtain the joint position candidate by previously calculating the correlation between the partial region and the joint position at the time of learning. The correlation may include, e.g., a distance, a direction and the like. Incidentally, it is possible to calculate the plurality of joint position candidates by using information of the plurality of partial regions. Moreover, it is possible to calculate, by using only the partial region around a certain specific joint, the center position or the weighted centroid position of the partial region as the joint position candidate. In case of using a method such as a mean-shift method or the like, it is possible to calculate the centroid for each cluster, and set the calculated centroids to the plurality of joint position candidates.

Next, the method of calculating the joint position candidate by using the plurality of detectors will be described. In this method, it is possible, by using the plurality of detectors for the human body such as the head detector, the trunk detector, the hand detector, the leg detector and the like, to detect the parts corresponding to the respective detectors in the human body region of the range image. Here, the process actually using the detector may be achieved by using a known method. For example, it is conceivable to use the SVM or a boosting as the discriminator by using the HOG feature amount, the Edglet feature amount or the like as the feature amount. The target part is detected by each detector, and the likelihood and the position of the part is obtained. Then, as well as the method using the partial region discriminator, it is possible to obtain the joint position candidate from the detected part by previously calculating the correlation between the part to be detected and the joint at the time of learning. Besides, it is possible, by detecting the plurality of parts with each detector, to obtain the plurality of joint position candidates.

Also, it is possible to use the method of directly calculating the joint position candidate by connecting the relation between the feature of the partial region and the joint position. At that time, for example, the method described in Ross Girshick, "Efficient Regression of General-Activity Human Poses from Depth Images", IEEE International Conference on Computer Vision, 2011 is used. In this method, two-point comparison of the range image is used for a feature amount, a decision tree is used for the discriminator, and a relative vector to each joint position is directly calculated for each pixel. Then, the relative vectors from the pixels to the joints obtained in all the pixels are aggregated for each joint, and the joint position candidate is calculated by using the mean-shift. In the method described in Ross Girshick, "Efficient Regression of General-Activity Human Poses from Depth Images", IEEE International Conference on Computer Vision, 2011, the joint position candidate is uniquely calculated by the mean-shift. However, it is also possible to obtain the plurality of joint position candidates by selecting and using the plurality of clusters calculated by using the mean-shift.

<Learning of Human Body Model>

Next, the human body model which is necessary when the posture estimating unit 103 performs consistency estimation as the human body will be described.

Figures 3, 4:
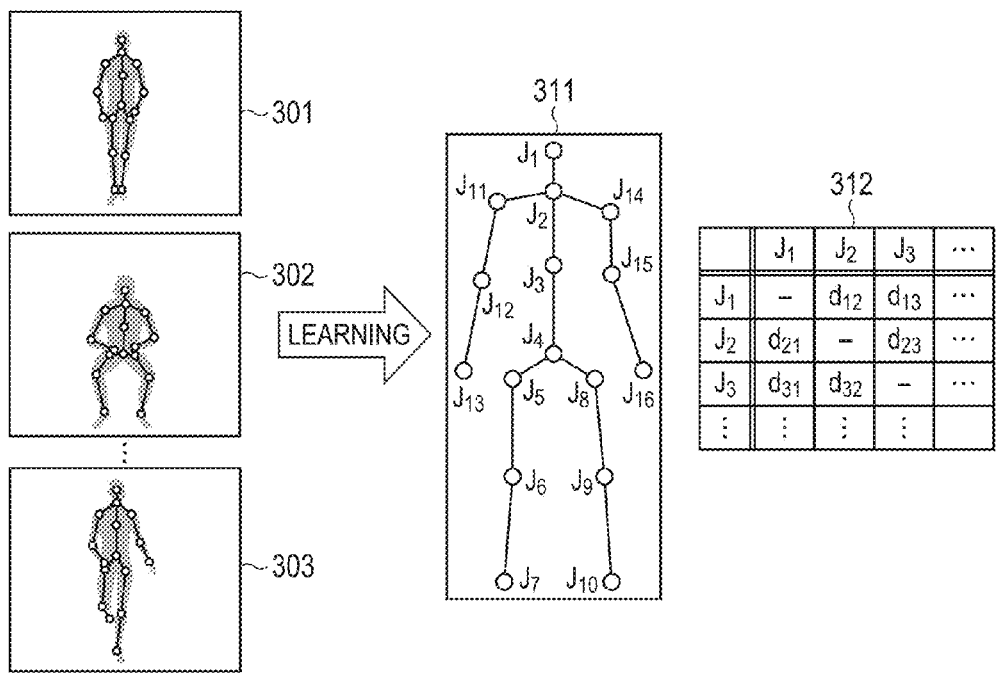
FIG. 3 is a diagram for describing a method of creating a human body model.
FIG. 4 is a diagram illustrating an example of joint position candidates for each joint.

FIG. 3 is a diagram for describing a method of creating the human body model.

As illustrated in FIG. 3, the posture estimating unit 103 calculates a table 312 concerning the joint position relation of a human body model 311, by using learning data 301, 302, . . . , and 30m which have been stored in the human body model storing unit 104 and in which the joint positions have already been known. Here, the human body model 311 includes joints $J_1$, $J_2$, . . . , and $J_{16}$.

Incidentally, to create the human body model, it is possible to use, as the learning data, not only the human body of only one person but also each group of the human bodies of persons having subequal heights and/or figures. Also, it is possible to use the human bodies for each classification considering sex, age and/or the like. Namely, there are numerous variations as the methods of obtaining the learning data, and the present embodiment is not limited by a specific method. Further, the number of the joint positions, which is specified as "16" in the example illustrated in FIG. 3, is not limited in the present embodiment. Namely, the number of the joint positions may be larger or smaller than "16".

The joint position relation indicates the relation between a certain joint and all of other joints. For example, in the table 312, a distance $d_{21}$ indicates the distance between the horizontal-axis joint $J_1$ and the vertical-axis joint $J_2$. Incidentally, there is no need for the joint position relation to indicate the relation between the certain joint and all of other joints. Namely, the joint position relation may indicate only the relation between the certain joint and the adjacent joint thereof, or the relation between the certain joint and one of more neighboring joints. In other words, the range in which the relation of the joints is given is not specifically limited in the present embodiment.

Besides, on the table 312, the relation between the joints is indicated as the distance. However, the relation between the joints may be indicated as an angle or the like. Incidentally, when considering the joint position relation three-dimensionally, it is necessary to use the relation among three points to use the angle. When using the distance, the angle and the like, it is possible not only to calculate only the average value thereof but also to assume a uniform distribution within a certain range from the average value. Also, it is possible to calculate a range of the joint positions permissible as the human body model by obtaining the average value and the dispersion and assuming, e.g., a normal distribution. Here, if the normal distribution is assumed, also a certainty factor can be obtained. Besides, it is possible to use, in addition to the average value, a weighted average value obtained by adding weights to the learning data, it is possible to obtain the centroid by the mean-shift or the like, or it is possible to calculate the range in view of a histogram. In any case, it should be noted that the present embodiment is not limited to such methods as described above.

<Evaluation of Consistency>

Subsequently, the method by the posture estimating unit 103 of, based on the joint position candidate of each joint and its likelihood, evaluating the consistency with respect to the human body model and determining the final joint position, thereby estimating the posture will be described.

Incidentally, the relevant joint position candidate is obtained by the joint position candidate calculating unit 102 according to the above method, and a threshold may be set to the likelihood when the joint position candidate is selected. Further, if an expected position can previously be predicted, it is possible to limit the joint position candidate to those within a certain range based on such information.

FIG. 4 is a diagram illustrating an example of the three-dimensional positions (x, y, z) and the likelihood of the joint position candidates for each joint. In a case where there are $n_i$ joint position candidates for a certain joint $J_i$, the number of combinations of the joint position candidates is $n_1 \times n_2 \times \ldots \times n_N$ groups (hereinafter, referred to as $\pi n_i$ groups) if the number of the joints is N. Here, it should be noted that the relevant combinations include the combination of the joint position candidates which are impossible as the human body. Further, as illustrated in FIG. 4, the number of the joint position candidates may be different or same for each joint. For example, the two joint position candidates may be set for the joint $J_1$, and the four joint position candidates may be set for the joint $J_2$.

Next, with respect to the combinations of the $\pi n_i$ groups, it is evaluated whether or not each combination of the joint positions is possible. First, the a-th combination of the joint position candidates in the $\pi n_i$ groups is set as $(J_{a1}, J_{a2}, \ldots, J_{aN})$ the likelihood of each joint position candidate at this time is set as $(l_{a1}, l_{a2}, \ldots, l_{aN})$, and each coordinate position is set as $((x_{a1}, y_{a1}, z_{a1}), (x_{a2}, y_{a2}, z_{a2}), \ldots, (x_{aN}, y_{aN}, z_{aN}))$. Then, the distance between joints i and j is set as a distance $d_{ij}$ from the human body model, and a certain range $d_f$ is set.

Here, for example, the certain range $d_f$ is determined based on the maximum value, the minimum value, the dispersion and the like of the inter-joint distance of the human body model previously learned. If the certain range $d_f$ is set within the range including the maximum and minimum values, it is considered to permit an individual difference to the extent existing in the learning data. Further, with respect to how much variation should be permitted, it is preferable to set the certain range $d_f$ on the basis of the dispersion.

Next, if the consistency to be evaluated satisfies the following expression (1), the value $w_{ij}$ in the following expression (2) is set to "1", and otherwise the value $w_{ij}$ in the following expression (2) is set to "0". If the number of other joints to be used for decision of the certain joint i is n(i), for example, an evaluation value f(a) is calculated by the following expression (2).

$$d_{ij} - d_f < \sqrt{(x_{ai} - x_{aj})^2 + (y_{ai} - y_{aj})^2 + (z_{ai} - z_{aj})^2} < d_{ij} + d_f \quad (1)$$

$$f(a) = \sum_{i=1}^{N} l_{ai} \cdot \left( \prod_{j=1}^{n(i)} w_{ij} \right) \quad (2)$$

Incidentally, the portion of $\pi w_{ij}$ in the expression (2) is "1" only in case of a certain possible joint position, and otherwise the portion of $\pi w_{ij}$ is "0". Namely, in the evaluation value f(a), the likelihood is added only in case of the possible joint position as the human body. Then, it is possible to estimate the consistent posture by selecting the posture having the maximum evaluation value f(a).

Figure 5:
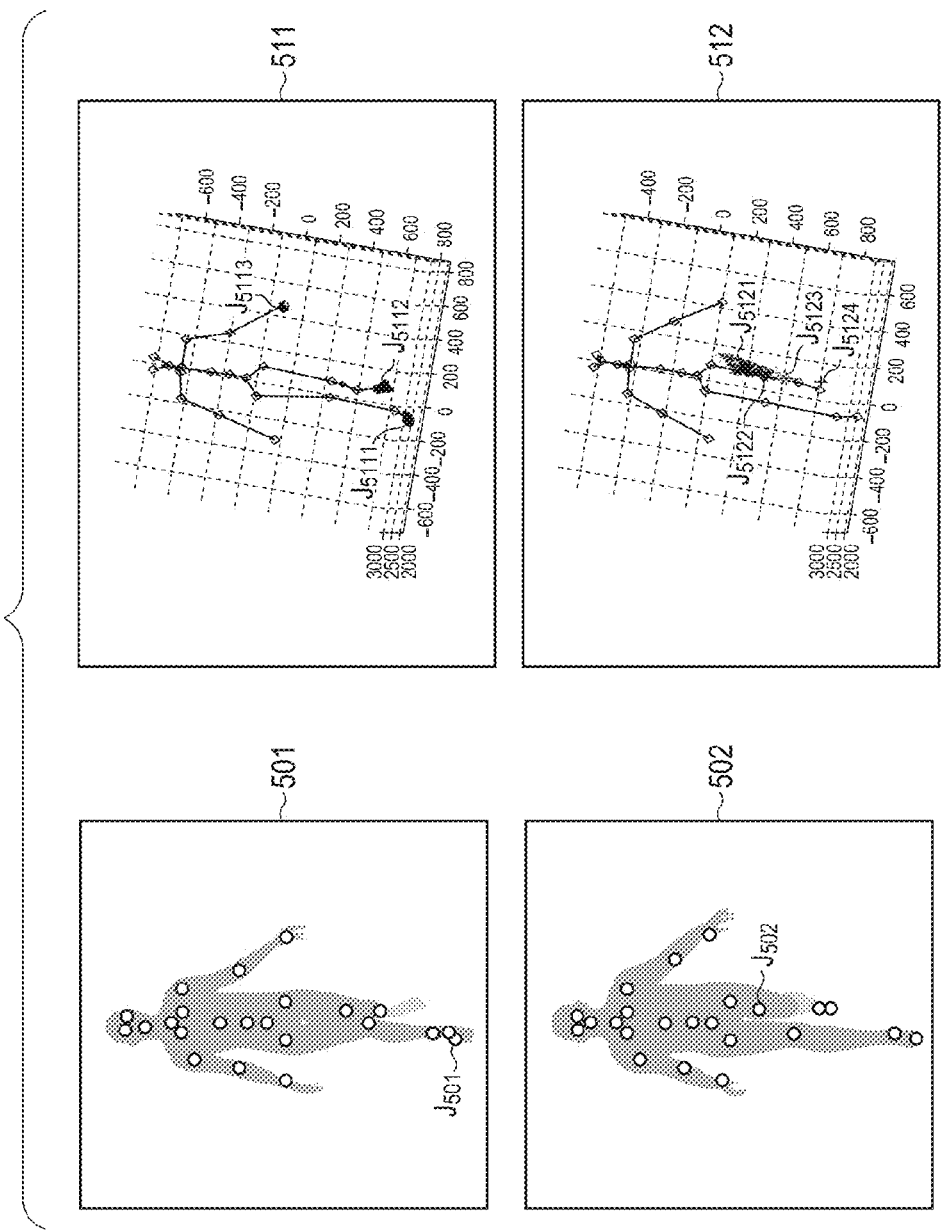
FIG. 5 is a diagram for describing a method of deciding joint position candidate possibility.

On the other hand, when calculating the joint position without considering the consistency of the human body model, there is a case where, as indicated by an image 501 illustrated in FIG. 5, the point to be really estimated as the left toe position is erroneously estimated as a joint $J_{501}$ corresponding to the right toe position. Also in this case, the consistency evaluation is performed as described above in view of the consistency with the human body model. For example, it is assumed that, as the joint position candidates of the left toe erroneously estimated in the image 501, joint position candidates $J_{5111}$, $J_{5112}$ and $J_{5113}$ in a human body model 511 are obtained. In these candidates, the joint position candidate $J_{5112}$ which should essentially be selected from the position relation with the left ankle and the left knee is selected, so that it is possible to estimate the posture which is consistent as the human body.

Further, when evaluating the consistency with the human body model, the consistency is evaluated using the plurality of human body models respectively having the different heights, figures and the like. At this time, the distance $d_{ij}$ between the joints i and j of the human body model and the certain range $d_f$ which are included in the expression (1) are calculated for each human body model. Then, the evaluation values f(a) are calculated according to the above procedure for all of the human body models, and the human body model having the maximum evaluation value is determined as the posture. Thus, since the evaluation value of the human body model of which the height and figure are appropriate for the target is high, it is possible to estimate the posture with higher accuracy. Of course, if the height and figure of the target have been known previously, it is possible to calculate the evaluation value using only the human body models corresponding to the known height and figure.

For example, in an image 502 illustrated in FIG. 5, it is assumed that the point to be really estimated as the left knee position is estimated as a slightly higher joint $J_{502}$. With such an estimation error, it appears that the human body model has consistency as the human body to some extent. However, there is no consistency in light of the height and figure of the target individual. Here, it is necessary to respectively evaluate the consistencies, while taking the inter-joint distances into consideration by using the plurality of human body models previously learned. In a case where a human body model 512 having the height and figure appropriate for the target is used, a joint position candidate $J_{5122}$ closer to the correct position is selected from among joint position candidates $J_{5121}$, $J_{5122}$, $J_{5123}$ and $J_{5124}$ of the left knee. Thus, it is possible to estimate the posture which is consistent as the target individual.

Incidentally, the evaluation value is not limited to those as described above. Namely, it is possible to merely deciding whether or not the evaluation value is possible as the joint position candidate and only adding the likelihood thereto. Further, it is possible to perform weighting to the likelihood to be added. In the example indicated by the expression (2), the uniform distribution is assumed when the possibility as the joint position candidate is decided. However, if the normal distribution is assumed instead of the uniform distribution, it is possible to achieve stochastic decision and output instead of the decision as to whether the value $w_{ij}$ is equal to "1" or "0".

Besides, although only the inter-joint distance of the human body model is used in the expression (1), it is possible to further use the angle. In this case, it is necessary to decide not only the value $w_{ij}$ based on the distance but also the value based on the angle. Here, if the angle between the straight line connecting the joints i and m with each other and the straight line connecting the joints i and n with each other is within a predetermined range, it is assumed that the value $w_{imn}$ used in the following expression (3) is and otherwise it is assumed that the value $w_{imn}$ is "0". Then, if it is assumed that the number of other joints to be used for the distance decision of the certain joint i is nd(i) and the number of other joints to be used for the angle decision is na(i), for example, the evaluation value f(a) is calculated by the following expression (3).

$$f(a)=\Sigma_{i=1}^{N} l_{ai} \cdot (\Pi_{j=1}^{nd(i)} w_{ij}) \cdot (\Pi_{m=1,n=1}^{na(i)} w_{imn}) \quad (3)$$

As compared with the expression (2), the decision item for deciding whether or not the joint angle is possible as the human body is further added in the expression (3). Thus, only if both the distance and angle are appropriate as the human body, that is, only if all of the values $w_{ij}$ and $w_{imn}$ are not "0", the likelihood is added. Incidentally, the evaluation value is not limited to that described above. Moreover, it is possible to use not only the inter-joint distance and angle of the human body model, but also a ratio between the rightward inter-joint distance and the leftward inter-joint distance using the fact that the human body is bilaterally symmetric.

Thus, it is possible by determining the combination of the joint positions as described above to obtain the posture of the target from the image. Further, it is also possible to add a model fitting unit to the constitution illustrated in FIG. 1. In this case, the model fitting unit sets the calculated posture as an initial posture, generates a three-dimensional point group from the input range image, and performs model fitting to the generated point group by using some kind or another human body model. Thus, it is possible to calculate the final posture with higher accuracy. For example, as the human body mode, there is a model which consists of a combination of cylinders. Besides, it is possible to perform the model fitting by a known method.

<Speeding Up of Consistency Evaluation>

In the above example, since the evaluation values are calculated for all the combinations, the process takes much time. Under the circumstances, a method of setting a certain joint position candidate as the start point and then sequentially evaluating the consistencies for the adjacent joint position candidates will be described. In that case, if there is the joint position candidate of which the evaluation value is low, the subsequent processes for the relevant joint position candidates are stopped, so that it is possible to speed up the entire process.

First, it is necessary to determine the joint which serves as the start point. As the start point, it is preferable to use the joint for which the stable accuracy could be obtained in the learning. Although the joint of, e.g., the head, the neck, the waist or the like may be used, the present embodiment is not specifically limited to this. In the present embodiment, an example that the joint position candidate of the head is used as the start point will be described.

First, it is assumed that the three-dimensional position (x1_1, y1_1, z1_1) of the one joint position candidate in the joint $J_1$ of the head is the correct position, and the consistency of the three-dimensional position (x2_1, y2_1, z2_1) of the one joint position candidate in the joint $J_2$ of the adjacent neck is evaluated. How to evaluate the consistency in this case is equivalent to that in case of evaluating all the combinations. However, since the decided joint is only that for the head at this point, the consistency is evaluated only based on the relation with the head. Then, if the evaluation value is equal to or higher than a certain threshold, the consistency of the three-dimensional position (x3_1, y3_1, z3_1) of the one joint position candidate in the joint $J_3$ adjacent to the neck is further evaluated. At this time, since the decided joints are the joint of the head and the joint of the neck, the consistency is evaluated based on the relation with the head, the neck and the joint position candidate adjacent to the neck. Incidentally, it is possible to use only either the head or the neck. In this way, the adjacent joints are sequentially evaluated.

If the evaluation value does not exceed the certain threshold, or if the sequential evaluations for all the joint positions are ended and the evaluation values are calculated up to the final evaluation value, the evaluation of other joint position candidate is performed, and the same processes as those described above are performed. For example, the three-dimensional position (x1_1, y1_1, z1_1) of the one joint position candidate in the joint $J_1$ of the head and the three-dimensional position (x2_2, y2_2, z2_2) of the second joint position candidate in the joint $J_2$ of the neck are evaluated. After the process were repeatedly performed, from the combination of the joint positions for which the final evaluation values could be calculated, the joint position having the maximum evaluation value is determined as the final posture. Further, on the assumption that the correct position is not included in the joint position candidate serving as the start point or that there is no joint position candidate, it is preferable to determine second and third start point candidates.

As just described, according to the present embodiment, the joint position candidate of the human body is estimated, the consistency as to whether or not the joint position candidate corresponds to the joint position possible as the human body is evaluated, and then the final posture is estimated. Thus, it is possible to reduce the local accuracy deterioration and obtain the posture more consistent as the multi-joint object. Further, it is possible, by setting the permissible range of the joint position according to the normal distribution or the uniform distribution when determining the joint position, to somewhat absorb individual differences of the targets. Furthermore, it is possible, by using the plurality of human body models respectively having the different heights and figures for determining the joint position, to determine the joint position appropriate for the target, and it is thus possible to further improve the posture estimation accuracy.

Besides, in case of evaluating the consistency, it is possible not only to narrow the joint position candidates to only one as the final candidate but also to select the several high-order candidates by considering all the combinations of the joint position candidates. Further, it is possible, by not evaluating all the combinations but evaluating the consistencies of the adjacent joint position candidates one by one, to speed up the process as a whole. Furthermore, it is possible, by estimating the consistent posture and thereafter performing the fitting process based on the estimated posture as the initial posture, estimate the posture with the local accuracy further improved.

Second Embodiment

According to the present embodiment, in addition to the consistency of the joint position arrangement as the human body, appropriateness concerning whether or not the input range image has a contradiction is added to the indicator for the consistency evaluation. More specifically, the range image is first obtained from the distance imaging apparatus, the joint position candidate of the human body included in the obtained range image is estimated, the consistency of the joint position arrangement as to whether or not the joint position arrangement is possible as the human body is evaluated, the consistency with the input range image is evaluated, and then the final posture is estimated. Hereinafter, the portions in the present embodiment different from the first embodiment will be described.

<Constitution and Outline>

Since the basic constitution of the present embodiment is the same as that illustrated in FIG. 1, the description of the overlapping portions is omitted here. In the present embodiment, the posture estimating unit 103 further evaluates whether or not the joint position candidate is contradictory to the human body region of the range image extracted by the range image inputting unit 101. In other words, the posture estimating unit evaluates the consistency with the range image. Then, the above processes are repeatedly performed, also the likelihood of the joint position candidate is considered, and thus the posture corresponding to the best combination of the joint positions is determined.

<Evaluation of Consistency>

Since the method of evaluating the consistency with the human body is the same as that already described in the first embodiment, the description thereof is omitted here.

Hereinafter, the evaluation of the consistency with the input range image will be described.

Figure 6:
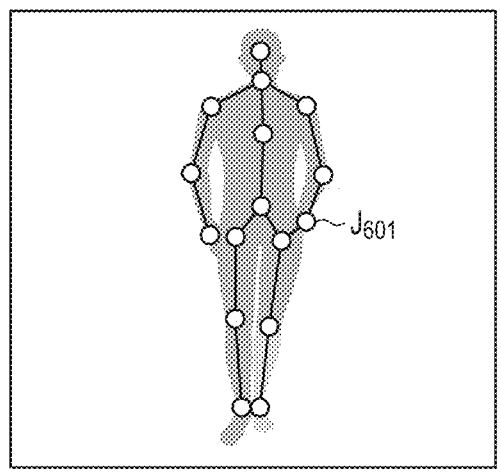
FIG. 6 is a diagram for describing a method of deciding whether or not an estimated joint position is within a range of a human body region.

In an example illustrated in FIG. 6, the position of a joint $J_{601}$ is outside the human body region of the range image. In case of individually calculating the joint position candidate by the method as described in the first embodiment, there is a case where the joint position candidate deviates from the human body region of the input image because the center, the centroid or the like of the estimated position is calculated depending on the method. For this reason, the consistency is confirmed by deciding whether or not the joint position is within the human body region of the range image. Here, the value S(i) included in the following expression (4) is set to "1" if the joint i is included in the human body region, whereas the value S(i) is set to "0" if the joint i is not included in the human body region. In combination with the evaluation of the human body model taking the distance of the joint positions into consideration, the evaluation value f(a) is calculated by the following expression (4).

$$f(a)=\Sigma_{i=1}^{N} l_{ai} \cdot (\Pi_{j=1}^{n(i)} w_{ij}) \cdot S(i) \quad (4)$$

As just described, the value S(i) is "1" only when the certain joint i is consistent with the range image, whereas the value S(i) is "0" otherwise. That is, in the evaluation value f(a) is obtained by adding the likelihood only when the joint position candidate which is consistent with the range image and also consistent with the human body is obtained. Incidentally, the evaluation value is not limited only to this. Namely, it is possible to add the decision further based on the angle as indicated by the expression (3). In this case, the evaluation value f(a) is calculated by the following expression (5).

$$f(a)=\Sigma_{i=1}^{N} l_{ai} \cdot (\Pi_{j=1}^{nd(i)} w_{ij}) \cdot (\Pi_{m=1,n=1}^{na(i)} w_{imn}) \cdot S(i) \quad (5)$$

Moreover, when evaluating the consistency with the range image, it is necessary to include not only the dislocation (declination) in the image plane direction as illustrated in FIG. 6 but also a dislocation in the depth direction. In the range image, the joint position smaller than the depth value (i.e., the front side) never exists if an influence of a noise or the like is eliminated. Also, such a fact is used for evaluating the human body region. Namely, it is assumed that the human body region includes not only the two-dimensional image plane but also the three-dimensional image plane.

As just described, according to the present embodiment, it is possible to obtain the posture which is consistent as the multi-joint object and is also consistent with the input image.

Third Embodiment

In the present embodiment, a method of estimating the joint position in consideration of a case where shielding occurs will be described. In the present embodiment, when the consistency is evaluated, a combination obtained in a case where a certain joint has been shielded is considered in addition to all the combinations of the joint position candidates.

In the present embodiment, an example that the consistency is evaluated in consideration of the case where shielding further occurs in the example described in the first embodiment will be described. More specifically, the range image is first obtained from the distance imaging apparatus, the joint position candidate of the human body included in the obtained range image is estimated, the consistency of the joint position arrangement as to whether or not the joint position arrangement is possible as the human body also in consideration of the shielding is evaluated, and then the final posture is estimated. Hereinafter, the portions in the present embodiment different from the first embodiment will be described.

<Constitution and Outline>

Since the basic constitution of the present embodiment is the same as that illustrated in FIG. 1, the description of the overlapping portions is omitted here. In the present embodiment, the posture estimating unit 103 further adds a case where it is assumed that the certain joint shields, to the candidate. That is, the shielded joint position candidate is added. Then, the above processes are repeatedly performed, also the likelihood of the joint position candidate is considered, and thus the best combination of the joint positions, i.e., the posture, is determined.

<Evaluation of Consistency>

Hereinafter, the points different from the first embodiment will be described. If there are unshielded $n_i$ joint position candidates for a certain joint $J_i$ and also the shielding state is one of the joint position candidates, then there are the $(n_i+1)$ joint position candidates. If it is assumed that the number of the joints is "N", then the number of the combinations of the joint position candidates is total $(n_1+1) \times (n_2+1) \times \ldots \times (n_N+1)$ groups (hereinafter, referred to as $\pi(n_i+1)$ groups). As well as the first embodiment, the number of the joint position candidates may be different or same for each joint.

Then, with respect to the combinations of $\pi(n_i+1)$ groups, it is evaluated whether or not the joint position candidates including the shielded candidates are possible as the joint positions. At this time, it is assumed that the likelihood of the shielded joint position candidate is set to "0" and the coordinate position thereof is set to NaN. Incidentally, it is also possible to have a shield flag separately. Namely, the process to be performed when the shielding occurs is not limited to such values.

Here, if the target to be evaluated satisfies the above expression (1), the value $w_{ij}$ in the following expression (6) is set to "1", and otherwise the value $w_{ij}$ in the following expression (6) is set to "0". At this time, it is assumed that both the joints i and j to be used are not shielded. If the number of other joints to be used for decision of the certain joint i is n(i), an evaluation value f(a) is calculated by the following expression (6).

$$f(a)=\Sigma_{i=1}^{N} (l_{ai} \cdot (\Pi_{j=1}^{n(i)} w_{ij})+o_i) \quad (6)$$

Here, it is assumed that the joint number n(i) at this time is the number from which the shielded joints are excluded. Further, it is assumed that the value $o_i$ means the weight in the shielding, and thus the value $o_i$ is "0" at the time other than the shielding. Namely, in this example, either the value $l_{ai}$ or the value $o_i$ is not "0". If there is no term corresponding to the value $o_i$ in the expression, the evaluation value in case of the shielding is the same as the evaluation value in the case where there is no joint position candidate. However, if there is the term corresponding to the value $o_j$, it is possible to have the effect that the shielding state is given priority over the joint position candidate inconsistent as the human body arrangement.

<Speeding Up of Consistency Evaluation>

As well as the first embodiment, even in the case where the shielding is considered, it is possible to speed up the entire process by determining the certain joint candidate as the start point, and then sequentially evaluating and determining the consistencies for the adjacent joint position candidates. In this case, it is possible, by stopping the subsequent processes for the joint position candidates for which the evaluation values are low, to speed up the entire process. However, it is necessary to additionally consider the shielded state as the joint position candidate.

First, the joint for which the stable accuracy could be obtained in the learning and which serves as the start point is determined. For example, it is assumed that the three-dimensional position (x1_1, y1_1, z1_1) of the one joint position candidate in the joint $J_1$ of the head is the correct position, and the consistency of the three-dimensional position of the one joint position candidate in the joint $J_2$ of the adjacent neck is evaluated. Here, the evaluation method in the state that the shielding does not occur is the same as that in the first embodiment.

Here, for example, in the example illustrated in FIG. 4, there are the four joint position candidates for the neck. In the present embodiment, the shielding state is added thereto as the fifth candidate. In regard to the joint position candidate of the head, the joint J2 of the neck is in the shielding state, and the evaluation of the further adjacent joint is continued. In that case, the consistency is evaluated in relation to the head which is unshielded and decided joint. That is, the next joint is selected and evaluated while the joint position candidate including the shielding state is remained. In this case, although the number of the combinations of the joint position candidates is larger than those in the case where the shielding is not considered, it is possible to perform the process at high speed as compared with the case of the processes for all the combinations.

As described above, according to the present embodiment, even in the case where the shielding occurs, it is possible to obtain the posture which is more consistent as the multi-joint object.

Fourth Embodiment

In the present embodiment, appropriateness concerning whether or not the input range image has a contradiction is further added as the indicator for consistency evaluation. According to the present embodiment, in addition to the evaluation of the consistency between the joint position candidate and the range image as described in the second embodiment, evaluation of the consistency between the obtained human body model and the input range image is performed.

<Constitution and Outline>

Since the basic constitution of the present embodiment is the same as that illustrated in FIG. 1, the description of the overlapping portions is omitted here. In the present embodiment, the posture estimating unit 103 evaluates whether or not the human body model obtained from the joint position candidate is contradictory to the human body region of the range image extracted by the range image inputting unit 101 (i.e., the consistency with the range image).

<Evaluation of Consistency>

The method of evaluating the consistency with the human body is the same as that described in the first embodiment, the description thereof is omitted here. If it is assumed that the estimated joint position is the true value, the human body model obtained from the relevant joint position is expected to coincide with the human body region in the range image. Therefore, the consistency is evaluated by evaluating the degree of coincidence between the human body model obtained from the joint position and the human body region in the input range image.

Figure 7:
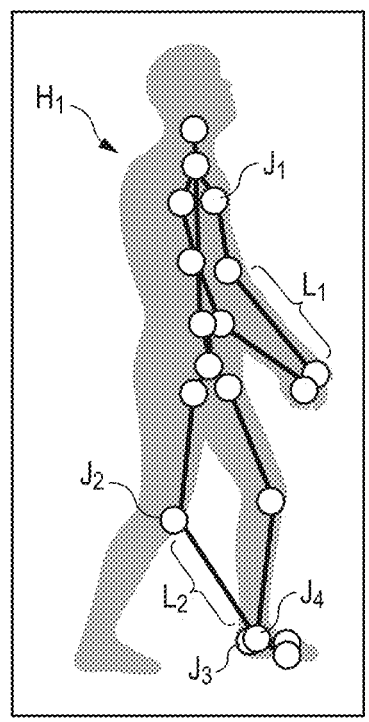
FIG. 7 is a diagram illustrating an example of the human body model from which the human body region and a depth value of each joint are disregarded.

In the present embodiment, the consistency between the human body model obtained from the joint position candidate arrangement and the input range image is obtained. Hereinafter, the combination of the joint position candidates for consistency evaluation is assumed as "a", the number of the joints included in "a" is assumed as "n", and the number of the partial models constituting the human body model represented from "a" is assumed as "m". Here, the partial model is the model which is obtained by further decomposing the human body model to each part. For example, the partial model includes an upper body model, an arm model, an upper arm model or the like, and any particle size may be adopted as the partial model. As the combination "a" of the joints for the consistency evaluation, it is unnecessary to use all the joints constituting the human body. Namely, it is possible to use only partial joints as the combination, and an example thereof is illustrated in FIG. 7. In FIG. 7, a point group $H_1$ represents the human body region in the range image. Moreover, joints $J_1$ to $J_n$ constituting the combination "a" of the joint position candidates for the consistency evaluation and partial models $L_1$ to $L_m$ obtained from the joint arrangement are represented.

In the present embodiment, to evaluate the consistency with the human body model represented from the combination "a" of the joints estimated as the human body region, the human body region and the joints included in the combination "a" are projected on a two-dimensional plane. Here, as an alternative means of the projection, it is also possible to use a projection in which the Z coordinate axis corresponding to the depth values of the human body region and the respective joints is ignored. Hereinafter, such a case as illustrated in FIG. 7 in which the depth values of the human body region and the respective joints are simply ignored will be described. Although it is assumed that the position and likelihood of each joint are the same as those indicated in FIG. 4, the Z-axial coordinates are ignored on the premise that the human body region and the joints are projected on a plane.

Here, the partial models $L_1$ to $L_m$ in FIG. 7 correspond to so-called skeleton models each of which is constituted by connecting the linked joints with each other using the straight line. Otherwise, it is possible to use an arbitrary model as the partial model of the human body model. For example, it is possible to replace the partial model with a region part such as an elliptical part, a trapezoidal part, another polygonal part or the like. Further, to use a more detailed human body model, it is possible to constitute the human body model by, for example, meshing the actual distance data. Hereinafter, a concrete example that the partial models of the human body constituted by the straight lines are used when the estimated results of the joints and the human body region are projected on a plane will be described. Here, it is possible to use rectangles instead of the straight lines. In such a case, for the purpose of quantification of inconsistency, it is necessary to use the rectangle having a width not exceeding at least the human body region basically when the estimated result of the joint has the true value.

In the example illustrated in FIG. 7, it turns out that the positions of the partial models $L_1$ and $L_2$ are outside the human body region in the range image. As the reason thereof, it is considered that the human body model obtained from the joints estimated as the human body region in the input range image occurs inconsistency. Consequently, to quantify the quantity of the partial models existing outside the human body region of the range image, an inconsistency score $p_{out}(\bullet)$ is calculated by the following expression (7).

$$p_{out}(a) = s(L_1 \cup L_2 \cup \ldots \cup L_m) - ((L_1 \cup L_2 \cup \ldots \cup L_m) \cap H_1 \quad (7)$$

In the above expression, the symbol $\cup$ indicates the sum set which corresponds to the sum of the regions in which the partial models exist, the symbol $\cap$ indicates the product set, and the symbol $s(\bullet)$ indicates the function for returning the number of the pixels of the region provided. Here, the number of the pixels is obtained as a result of superposing the human body model on the human body region in the range image. Incidentally, to reduce the process by a computer, it is possible not to calculate all the numbers of the pixels in the region designated by the function $s(\bullet)$ but to calculate the number of the pixels as to the meshed partial region (i.e., sampling). Thus, it is possible to reduce data traffic for calculating the number of the pixels in the range image, so that it is possible to shorten a processing time of the computer. Besides, since the human body region in the range image is imaged smaller in size as it exists in the deeper direction, there is a problem that the number of the pixels obtained by the function $s(\bullet)$ as to depth information easily changes. Therefore, to calculate a more accurate area as to the depth information, it is possible to weight the output of the function $s(\bullet)$ by using the depth value or normalize the output of the function $s(\bullet)$.

It is possible to calculate, by the expression (7), the quantity of the inconsistency indicating that the partial model obtained from the combination "a" of the joints exists outside the human body region of the range image, whereas there is a case where it is necessary to consider an inconsistent quantity existing inside the human body region. For example, as well as FIG. 7, a human body model 801 illustrated in FIG. 8 indicates the joints of the combination "a" obtained from the joint position candidates concerning a human body region $H_2$ in the range image, and partial models $L'_1$ to $L'_m$ are represented on a plane. Here, although the partial models $L'_1$ and $L'_2$ are the partial models of the leg, the relevant leg does not correspond to the position of the leg which should exist essentially but erroneously corresponds to the position of the other leg.

Figure 8:
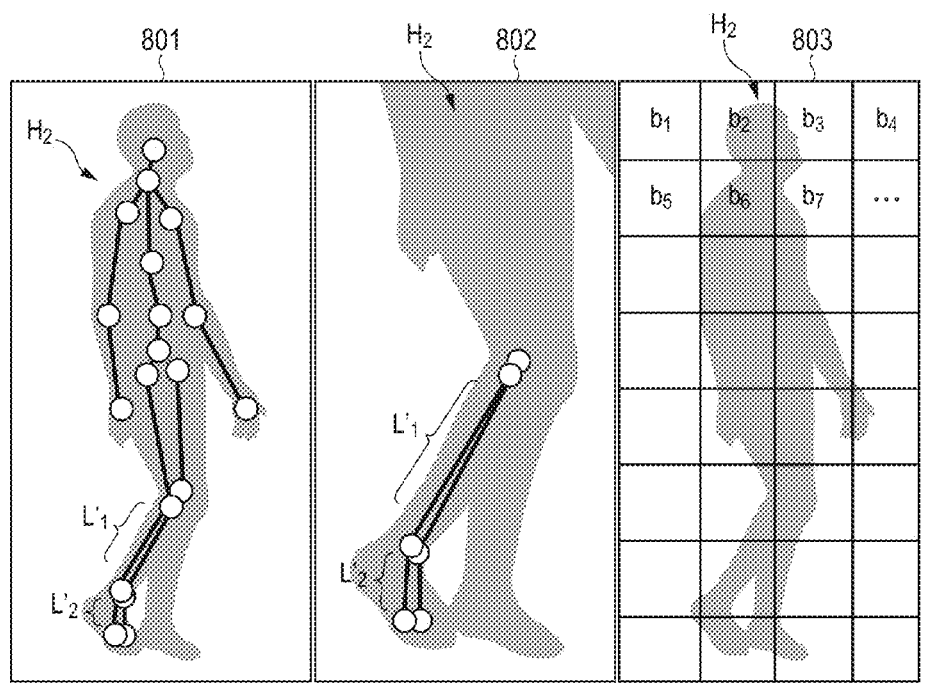
FIG. 8 is a diagram illustrating an example of the human body model in which partial models are represented on a plane and its enlarged portion.

A human body model 802 of the lower body illustrated in FIG. 8 is represented by enlarging the lower body of the human body model 801 for easier understanding. In the human body model 802 of the lower body illustrated in FIG. 8, it turns out that, due to the erroneous estimation of the position of the one leg, the partial model which should essentially exist does not exist at the center-lower leg portion in the human body region $H_2$.

Since the quantity inconsistent with the partial model existing in the human body region cannot be quantified by the expression (7), the inconsistent quantity in this case is adjusted by using, for example, the following expression (8).

$$p_{in}(a) = s(H_2) - s(L'_1 \cup L'_2 \cup \ldots \cup L'_m) \cap H_2 \quad (8)$$

With the expression (8), it is possible, by subtracting the number of the pixels of the partial model existing in the human body region, to obtain the remaining number of the pixels in the human body region, so that it is possible to quantify the score that the human body region and the partial model are not consistent with each other. At this time, it is also possible to use, instead of the number of the pixels obtained by the function $s(\bullet)$, the number of blocks obtained by dividing the range image for reducing a calculation amount as indicated by a human body model 803 illustrated in FIG. 8.

Here, blocks $b_1$ to $b_k$ correspond to the blocks obtained by dividing the human body region $H_2$ in the range image at certain intervals, and the symbol k indicates the total number of the blocks. At this time, it is possible to use any interval as the interval for dividing the range image into the blocks. In case of obtaining the function $s(\bullet)$ with use of the number of the blocks like this, it is necessary to calculate how many blocks in which the argument "$\bullet$" of the function $s(\bullet)$ exists in the region exist.

For example, if the function $s(H_2)$ is provided, since the range image does not exist in the block $b_1$, any count is not performed. On the other hand, since the range image exists in the block $b_2$, "1" is counted. Then, by repeating suchlike process for the blocks $b_1$ to $b_k$, it is possible to calculate, as the function $s(H_2)$, the number obtained by counting the number of the all blocks in which the human body region $H_2$ exists respectively. Also, in a case where the argument "$\bullet$" of the function $s(\bullet)$ corresponds to the partial model, the calculation is performed likewise. Thus, it is possible to count up the number of the blocks by deciding whether or not the partial model exists in each block.

Incidentally, although the example that the number of the blocks is used in substitution for the number of the pixels is described as above, it is also possible to use an area of the block. Moreover, as the method of dividing the range image into the blocks, it is possible not to perform the division beforehand but to repeat two-division a certain number of times only for the blocks in which the argument "$\bullet$" of the function $s(\bullet)$ exists respectively. In this case, it is possible to reduce a calculation amount.

By the expressions (7) and (8), it is possible to calculate the inconsistent score between the human body region and the partial model respectively concerning the inside and the outside of the human body region in the range image. However, there is a case where it is required to obtain consistency between the human body region and the partial model as a whole. Consequently, to consider the two inconsistent scores, for example, the following expression (9) is used. In the expression, the symbol $w_{out}$ indicates a weighting constant for $p_{out}(\bullet)$, and the symbol $w_{in}$ indicates a weighting constant for $p_{in}(\bullet)$.

$$p(a) = w_{out} p_{out}(a) + w_{in} p_{in}(a) \quad (9)$$

Although it is possible by the expression (9) to calculate the inconsistent quantity between the partial model obtained from the joint combination "a" and the human body region in the range image, probability of the joint combination "a" is not considered in such a state. Consequently, probability f of the combination "a" in which the consistency with the range image is considered is further calculated by the following expression (10).

$$f(a) = c - p(a) \quad (10)$$

Here, the symbol c indicates the total sum of the likelihoods of all the joints included in the joint combination "a". Thus, $f(\bullet)$, by which the value obtained by subtracting the inconsistency score $p(\bullet)$ from the total sum c of the likelihoods is output, represents a consistency evaluation value indicating the consistency between the estimated joint position and the human body region. More specifically, if the inconsistency score p(•) is "0", the estimated model coincides with the human body region. On the other hand, as the inconsistency score p(•) becomes larger, degree of the inconsistency with the human body region becomes large, and the value to be subtracted from the total sum c of the likelihoods becomes large.

Incidentally, if it is required to evaluate the consistency between the estimated result and the human body region also as to the depth information, it is possible not to perform the projection onto the two-dimensional plane but to decide the consistency on a three-dimensional space. In that case, if the depth value of the human body region is highly different from the depth value of the human body model of the joints estimated at the same position on the plane, it is considered that the inconsistency occurs, and it is possible to perform quantification as to the inconsistent region of the human body model. Here, as the concrete method for the quantification, for example, in a case where the human body model exists on the front side in regard to the depth value, there is a method of obtaining the total sum of the distances of the models.

In such a case where the human body region in the range image to be used in the present embodiment cannot correctly be extracted and thus the contour of the human body region is distorted from the original shape, a phenomenon that the human body region and the human body model do not often coincide with each other occurs. As a result, there is a case where the evaluation of the consistency becomes lower than usual. Consequently, by deciding that the inconsistency does not occur if f(a) is lower than a certain threshold, it is possible to calculate the consistency evaluation value comparatively robustly also as to the distortion of the human body region.

In the present embodiment, evaluation ranking is further performed to the plurality of joint position candidate combinations, by using the consistency evaluation function f(•) for the joint position candidate position.

Initially, it is assumed that a set A of the joint position candidate combinations $\{a_1, \ldots, a_q\}$ is provided. Here, the symbol q indicates the number of elements of the set A. Further, the consistency is evaluated for each of the components of the set A by using the expression (10) to provide a set $A_f = \{f(a_1), \ldots, f(a_q)\}$. It is possible, by rearranging the components of the set $A_f$ in descending order, to perform the evaluation ranking as to the components of the set A of the joint position candidate combinations.

Figure 9:
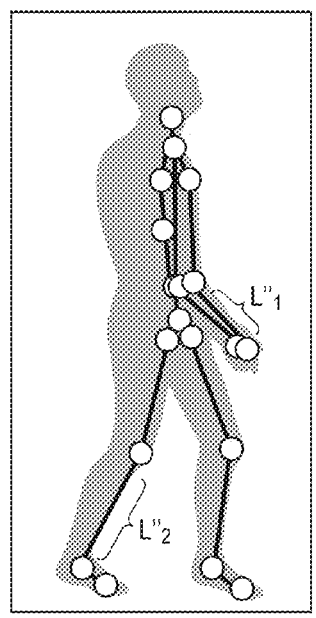
FIG. 9 is a diagram illustrating an example of the human body model in which the partial models are represented.

For example, it is assumed that the combination of the estimated joints illustrated in FIG. 7 is provided as $a_1$ and the combination of the joints illustrated in FIG. 9 is provided as $a_2$. At this time, the positions of the partial models $L_1$ and $L_2$ are outside the human body region of the range image in the combination $a_1$, whereas the positions of corresponding partial models $L''_1$ and $L''_2$ are not outside the human body region of the range image and all the partial models are inside the human body region in the combination $a_2$. As a result, since $f(a_2)$ is larger than $f(a_1)$, the evaluation rank of the combination $a_2$ is higher than that of the combination $a_1$.

<Speeding Up of Consistency Evaluation>

As well as the first embodiment, in the above example, since the consistency evaluation values are calculated for the combination "a" of numerous joints for which the consistency evaluations are necessary, there is a case where the process takes much time. Under the circumstances, it is possible to adopt a method of setting a certain joint position candidate as the start point and then determining the combination of the joint position candidates by sequentially evaluating the consistencies for the linked joint position candidates. In that case, if the consistency evaluation value of the linked joint position candidate is low, the calculation of the consistency evaluation value for the relevant joint position candidate is stopped at the subsequent connecting joint, so as not to include the relevant joint position candidate in the combination of the joint position candidates. Thus, it is possible to speed up the consistency evaluation. In any case, since the above process is the same as that for speeding up the consistency evaluation in the first embodiment, the description thereof is omitted here. Further, if the plurality of combinations of the joint position candidates are obtained by the above process, it is possible to further perform the above evaluation ranking.

As described above, according to the present embodiment, it is possible to obtain, in addition to the posture which is consistent as the multi-joint object, the posture which is consistent also in regard to the input image.

Fifth Embodiment

According to the present embodiment, appropriateness concerning whether or not there is a physical contradiction as the human body is added to the indicator for the consistency evaluation.

<Constitution and Outline>

Since the basic constitution of the present embodiment is the same as that illustrated in FIG. 1, the description of the overlapping portions is omitted here. In the present embodiment, the posture estimating unit 103 evaluates the consistency as to whether or not the positions of the joint position candidates calculated by the joint position candidate calculating unit 102 are physically contradictory to others because of overlap. Here, physical sizes of human body parts are considered in the consistency evaluation, and it concretely is decided whether or not the estimated joint of the human body has impossible overlap.

<Evaluation of Consistency>

Hereinafter, the detail of the present embodiment concerning the consistency evaluation of evaluating whether or not the joint position candidate has physically impossible overlap will be described.

In the present embodiment, the combination of the joints for consistency evaluation is assumed as "a", and the number of the joints included in the combination "a" is assumed as "n". Incidentally, as the combination "a" of the joints for the consistency evaluation, it is unnecessary to use all the joints constituting the human body. Namely, it is possible to use only the partial joints. In the example illustrated in FIG. 7, the joints $J_1$ to $J_n$ constituting the joint combination "a" for the consistency evaluation are represented. Here, it is assumed that the position of each joint and the likelihood thereof are the same as those indicated in FIG. 4.

Initially, it is decided, by using, for example, the following expression (11), whether or not arbitrary two joints among the joints $J_1$ to $J_n$ in the joint combination "a" overlap each other.

$$g(i,j)=1: \text{ if } |J_i-J_j| \le d$$

$$g(i,j)=0: \text{ else} \qquad (11)$$

Here, the distance between the two joints is calculated by the function g(i, j) to decide whether or not the arbitrary joints $J_i$ and $J_j$ included in the combination "a" overlap each other. As a distance function, the distance between the two joints on a three-dimensional Euclidean distance is obtained.

Incidentally, the symbol |•| indicates the function for calculating the norm on the three-dimensional space, and the symbol d indicates the arbitrary threshold representing the upper limit of the distance to be decided as the overlap. Moreover, "if" of the upper portion of the expression (11) indicates the conditional expression for the magnitude relation of the function |•| and the threshold d. If the conditional expression written on the right side of "if" is satisfied, it is decided that the two joints overlap each other, and the function g(i, j) has the value of "1". On the other hand, if not, the function has the value of "0" as the case of "else" of the lower portion of the expression.

The distance scale obtained here may be any scale if it indicates the distance between the joints. For example, it is possible to use the distance on the three-dimensional space, the distance projected on the two-dimensional plane, or some kind or another distance function. In that case, it only has to change the function |•| to an arbitrary distance function. Further, it is also possible to make the threshold d variable in regard to the two joints for the distance calculation. Furthermore, it is possible to represent the return value of the function g(i, j) as a real number instead of "1" or "0". For example, it is possible to calculate the distance value of the two joints $J_i$ and $J_j$ as it is. By the expression (11) like this, it is decided whether or not the distance value of the two joints is lower than the threshold serving as the standard based on which it is decided that the two joints overlap each other. If the distance value is lower than the threshold, it is decided that the joint positions overlap each other, so that it is possible to obtain the inconsistency score.

Next, the inconsistency score for the combination "a" of the joints is calculated. It is possible by the function g(i, j) to calculate the inconsistency score as to the overlap of the arbitrary two joints. Thus, it is possible by the following expression (12) to obtain the total sum of the inconsistencies of all the sets among the joints included in the combination "a" of the joints.

$$p(a) = \sum_{i,j \in a, i \neq j}^{a} g(i, j) \quad (12)$$

Here, in the function p(a), the inconsistencies of all the two sets among the joints included in the combination "a" are evaluated by the function g(i, j) and the total sum thereof is obtained. Further, to calculate the consistency evaluation value while taking the probability of the combination "a" of the joints into consideration, the expression (10) is used as well as the fourth embodiment.

Here, the symbol c indicates the total sum of the likelihoods of all the joints included in the joint combination "a" which the consistency is estimated, and the value obtained by subtracting the inconsistency score p(a) from the total sum c is provided. That is, the number of the sets of i, j satisfying the conditional expression of the upper portion of the expression (11) is subtracted from the total sum c, and the obtained value is output by the expression (10). Thus, it is possible to obtain the consistency evaluation value of the combination "a" of the joints.

Although the distance directly calculated from the joint position candidate is hitherto used, it is also possible to obtain the distance by defining a finer human body model. For example, as indicated by the partial models $L_1$ to $L_m$ of the human body illustrated in FIG. 7, it is possible to link by the straight line between the linked joints to express the human body model. Here, the symbol m indicates the number of the inter-joint links of the joints included in the combination "a".

If only the joint position candidate is used, it is impossible to consider the partial physical parts originally included in the human body. However, by using the partial models as described above, it is possible to obtain the consistency based on the actual human body. For example, by expressing the partial models with use of the straight lines, it is possible to calculate the distance between the partial models by obtaining the average value or the minimum value of the distances of the straight lines. In that case, by obtaining what percentage of all the straight lines overlap, it is possible to calculate the evaluation value more robustly. Of course, it is unnecessary to limit the partial model to the inter-joint straight line. That is, it is possible to evaluate the overlap between the partial models by using a higher-expressive model such as a cylindrical model, a detailed human body surface model or the like as needed.

In case of performing the ranking of the consistency evaluation values for the plurality of combinations of the joint position candidates, as well as the fourth embodiment, the set A of the combinations of the joint position candidates is determined, and the set $A_f$ is then obtained by using the expressions (10), (11) and (12).

Incidentally, by inverting the sign of the second term in the expression (10) from minus to plus and also inverting the magnitude relation of the "if" text of the upper portion of the expression (11) to ">", it is also possible to increase the consistency evaluation functions f(•) in the case where the consistency that the joints do not overlap each other is high. However, even in that case, relative magnitude of the value of the consistency evaluation function f(•) is resultingly different from others and the ranking of the set $A_f$ is not influenced. Therefore, it is possible to use which one of such methods as described above.

<Speeding Up of Consistency Evaluation>

As well as the first embodiment, in the above example, since the consistency evaluation values are calculated for the combination "a" of numerous joints for which the consistency evaluations are necessary, there is a case where the process takes much time. Under the circumstances, it is possible to adopt the method of setting the certain joint position candidate as the start point and then determining the combination of the joint position candidates by sequentially evaluating the consistencies for the linked joint position candidates. In that case, if the consistency evaluation value of the linked joint position candidate is low, the calculation of the consistency evaluation value for the relevant joint position candidate is stopped at the subsequent connecting joint, so as not to include the relevant joint position candidate in the combination of the joint position candidates. Thus, it is possible to speed up the consistency evaluation. In any case, since the above process is the same as that for speeding up the consistency evaluation in the first embodiment, the description thereof is omitted here. Further, if the plurality of combinations of the joint position candidates are obtained by the above process, it is possible to further perform the above evaluation ranking.

As described above, according to the present embodiment, it is possible to obtain the posture which is physically consistent as the multi-joint object.

Sixth Embodiment

According to the present embodiment, a final evaluation value in which a plurality of consistency evaluation values are simultaneously introduced is obtained in the consistency evaluation.

<Constitution and Outline>

Since the basic constitution of the present embodiment is the same as that illustrated in FIG. 1, the description of the overlapping portions is omitted here. In the present embodiment, the consistency evaluation is performed by using the plurality of evaluation values calculated by the posture estimating unit 103. That is, by performing the consistency evaluation using the plurality of calculated evaluation values simultaneously, it is possible to perform the consistency evaluation more accurately.

<Evaluation of Consistency>

Hereinafter, the points different from the first embodiment will be described.

In the consistency evaluation, it is possible to calculate the consistency evaluation value for the combination of the joint position candidates by, for example, the expression (10). In the present embodiment, the plurality of inconsistency scores are simultaneously introduced using the expressions (9) and (12). More specifically, it is possible to quantify the inconsistency with the human body model obtained from the joint positions estimated as the human body region in the range image by the expression (9), and to quantify the physical inconsistency as to whether or not the joint positions estimated by the expression (12) overlap. In the present embodiment, such plurality of evaluations as described above are performed simultaneously.

If the combination of the joints position candidates is assumed as "a", the final evaluation value in which the plurality of consistency evaluations are introduced is obtained by using, for example, the following expression (13). Hereinafter, the obtained final evaluation value will be described as the final evaluation value.

$$f(a) = c - \sum_{i}^{I} w_i p_i(a) \tag{13}$$

Here, the symbol c indicates the total sum of the likelihoods of the joints included in the joint position candidate combination "a", the symbol I indicates a kind of consistency evaluation to be used for calculating the final evaluation value, $w_i$ indicates a weighting constant for the consistency evaluation i, and $p_i(\bullet)$ indicates the evaluation value of the consistency evaluation i. As to the evaluation value $p_i(\bullet)$, for example, it is possible not only to directly use the expressions (9) and (12) but also to use another new consistency evaluation function.

In the second term of the expression (13), the total sum of the values obtained by weighting the respective consistency evaluations is obtained, and any value such as an integer, a real number or the like may be set. For example, it is preferable to set a non-negative real number by performing setting proportional to the importance of the consistency evaluation i in the kind I. Alternatively, it is possible to determine the value by boosting learning, cross-validation or the like. However, for example, in a case where the evaluation value $p_i(a)$ has a minus sign if the inconsistency of the joint position candidate combination "a" is high, the final evaluation value f(a) increases if the weighting constant $w_i$ is not negative. Consequently, it is necessary to set the sign of the weighting constant $w_i$ in conformity with the sign of the evaluation value $p_i(\bullet)$. Incidentally, although the expression (13) is the expression that the first term is subtracted by the second term, it is possible to be the product of all the terms. In that case, the following expression (14) is used.

$$f(a) = c \prod_{i}^{I} w_i p_i(a) \tag{14}$$

By doing so, the final evaluation value becomes lower when the total sum c of the likelihoods of the joints is lower, whereas the final evaluation value becomes higher when the total sum c of the likelihoods of the joints is higher. Namely, it is possible to further increase importance of the likelihood. As described above, it is possible to decide the form of the expression for calculating the final evaluation value in accordance with purposes.

In case of performing the ranking of the final evaluation values for the plurality of combinations of the joint position candidates in the present embodiment, as well as the fourth embodiment, the set A of the combinations of the joint position candidates is determined, and the set $A_f$ is then obtained by using the expression (13).

<Speeding Up of Consistency Evaluation>

As well as the first embodiment, in the above example, since the consistency evaluation values are calculated for the combination "a" of numerous joints for which the consistency evaluations are necessary, there is a case where the process takes much time. Under the circumstances, it is possible to adopt the method of setting the certain joint position candidate as the start point and then determining the combination of the joint position candidates by sequentially evaluating the consistencies for the linked joint position candidates. In that case, if the consistency evaluation value of the linked joint position candidate is low, the calculation of the consistency evaluation value for the relevant joint position candidate is stopped at the subsequent connecting joint, so as not to include the relevant joint position candidate in the combination of the joint position candidates. Thus, it is possible to speed up the consistency evaluation. In any case, since the above process is the same as that for speeding up the consistency evaluation in the first embodiment, the description thereof is omitted here. Further, if the plurality of combinations of the joint position candidates are obtained by the above process, it is possible to further perform the above evaluation ranking.

As described above, according to the present embodiment, it is possible to obtain the plurality of postures which are consistent as the multi-joint objects.

Seventh Embodiment

In the present embodiment, an example that the posture estimating unit 103 calculates the consistency evaluation value by further introducing a plurality of ratios of inter-joint distances will be described.

<Constitution and Outline>

Since the basic constitution of the present embodiment is the same as that illustrated in FIG. 1, the description of the overlapping portions is omitted here. In the present embodiment, the posture estimating unit 103 further performs, in addition to the conventional consistency evaluation, the consistency evaluation for each joint position candidate obtained by the joint position candidate calculating unit 102, with use of the ratio of the inter-joint distances.

Here, for example, the ratio of the inter-joint distances includes, in the human body model 311 illustrated in FIG. 3, the ratio between the length between the joints $J_{11}$ and $J_{12}$ and the length between the joint $J_{12}$ and $J_{13}$ (i.e., the ratio of the inter-joint distances between the front arm and the upper arm). In addition, for example, the ratio of the inter-joint distances includes the ratio between the distance between the joints $J_5$ and $J_6$ and the distance between the joints $J_6$ and $J_7$ (i.e., the ratio of the inter-joint distances between the femur portion and the crus portion in the leg), or the like. Further, the inter-joint distance to be used for the evaluation is not limited to the inter-joint distance in the arm or the leg. That is, for example, it is possible to use the ratio between the lengths of the right and left upper arms (i.e., the ratio between the distance between the joints $J_{11}$ and $J_{12}$ and the distance between the joints $J_{14}$ and $J_{15}$). In addition, for example, it is possible to use the ratio between the length of the arm (i.e., the sum of the distance between the joints $J_{11}$ and $J_{12}$ and the distance between the joints $J_{12}$ and $J_{13}$) and the length of the trunk (i.e., the sum of the distance between the joints $J_2$ and $J_3$ and the distance between the joints $J_3$ and $J_4$).

Incidentally, the information concerning the ratio of the inter-joint distances of the human body model obtained by the learning has been previously stored as the joint position permissible range information in the human body model storing unit 104, in order to evaluate the ratio of the inter-joint distances by the posture estimating unit 103. Thus, it is possible to refer to the designated ratio of the inter-joint distances.

Subsequently, each individual process will be described in detail. However, the description of the portions overlapping those in the previous embodiments is omitted here.

<Learning or Setting of Human Body Model>

Initially, the human body model which is necessary when the posture estimating unit 103 evaluates the consistency as the human body will be described. In case of creating the human body model, in addition to the learning of the human body model in the above embodiment (i.e., the learning of the inter-joint distance and inter-joint angle), the learning of the ratio of the inter-joint distances of the human body model in the present embodiment is performed. Incidentally, it is possible to perform each of these learnings independently.

Figures 10, 11:
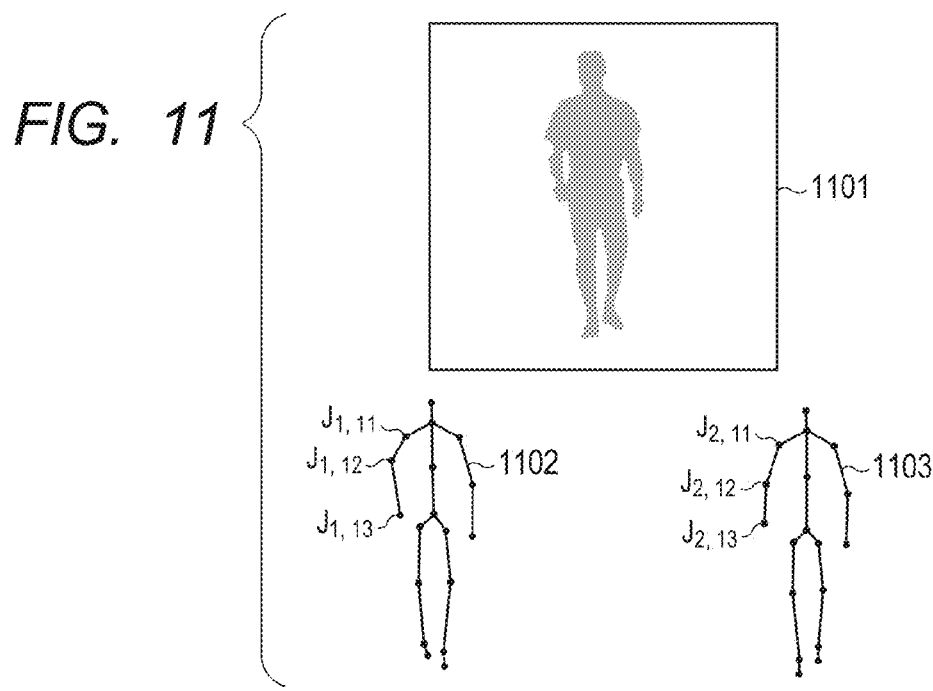
FIG. 10 is a diagram illustrating an example of learned ratios of inter-joint distances.
FIG. 11 is a diagram illustrating an example of a range image and its posture candidates.

The relation of the ratios of the inter-joint distances in the present embodiment is managed or controlled with, for example, a table 1001 as illustrated in FIG. 10. In FIG. 10, a ratio $r_1$ indicates the ratio between the distance between the joints $J_{11}$ and $J_{12}$ and the distance between the joints $J_{12}$ and $J_{13}$, and this corresponds to the ratio between the length of the front arm and the length of the upper arm in the right arm. Besides, a ratio $r_3$ indicates the ratio between the distance between the joints $J_5$ and $J_6$ and the distance between the joints $J_6$ and $J_7$, and this corresponds to the ratio between the length of the femur portion and the length of the crus portion in the leg.

Further, as indicated by the table 1001, it is also possible to learn the ratio between the length of the right arm and the length of the left arm, the ratio between the length of the right leg and the length of the left leg, the ratio between the length of the arm and the length of the trunk, or the like. Namely, in the present embodiment, the ratios are not limited to the ratios of the inter-joint distances indicated on the table 1001. As just described, in the present embodiment, in case of learning (or setting) the human body model, the ratio of the inter-joint distances is obtained as the joint position permissible range information.

<Evaluation of Consistency>

Subsequently, the method of the posture estimating unit 103 for, based on the joint position candidate of each posture candidate and its likelihood, evaluating the consistency with the human body model, determining the final joint position, and thus estimating the posture will be described. Incidentally, in the present embodiment, the points different from the above embodiments will be described.

FIG. 11 illustrates posture candidates 1102 and 1103 which are created by combining the joint position candidates calculated by the joint position candidate calculating unit 102 from a range image 1101 in which a person region is extracted. In the evaluation of the consistency, the evaluation value of the consistency is calculated by using the ratio between the inter-joint distances or the ratio of the sums of the plurality of inter-joint distances, as indicated on the table 1001 indicating the ratios of the inter-joint distances. At that time, the posture estimating unit 103 previously creates the posture candidate by combining the joint position candidates.

In case of evaluating the consistency using the ratio of the inter-joint distances, first, if the number of the calculation expression for the ratio of the inter-joint distances indicated on the table 1001 is "1", the ratio of the inter-joint distances is calculated using the following expression (15). Then, the ratio of the inter-joint distances is evaluated by the following expression (16).

$$r_{i,1} = \frac{\|J_{i,12} - J_{i,11}\|}{\|J_{i,13} - J_{i,12}\|} \tag{15}$$

$$h(i,j) = 1 \quad \text{if } r_j - r_f \le r_{i,j} \le r_j + r_f \tag{16}$$
$$h(i,j) = 0 \quad \text{else}$$

The expression (15) indicates that the Euclidean distance is calculated using the three-dimensional position coordinates (x, y, z) of the relevant joint J, the symbol i indicates the number of the posture candidate, the symbol j indicates the number of the calculation expression for the ratio of the inter-joint distances indicated on the table 1001, and the symbol $r_f$ indicates the certain range of the ratio of the inter-joint distances. Here, the certain range $r_f$ is determined based on the maximum value, the minimum value, the average value, the standard deviation and the like concerning the previously learned ratios of the inter-joint distances of the human body model.

For example, with respect to the posture candidate 1102 (assumed as i=1, hereinafter), a ratio $r_{1,1}$ between the distance between joints $J_{1,11}$ and $J_{1,12}$ and the distance between joints $J_{1,12}$ and $J_{1,13}$ is calculated by the expression (15). Likewise, with respect to the posture candidate 1103 (assumed as i=2, hereinafter), a ratio $r_{2,1}$ between the distance between joints $J_{2,11}$ and $J_{2,12}$ and the distance between joints $J_{2,12}$ and $J_{2,13}$ is calculated.

If a ratio $r_{i,1}$ of the inter-joint distances calculated by the expression (15) satisfies a range based on the certain range $r_f$, the value of h(i, j) in the expression (16) is set to "1" with respect to the selected posture candidate, whereas, if not, the value of h(i, j) is set to "0". For example, as the result of the evaluation of the ratio $r_{i,1}$ of the inter-joint distances of each of the posture candidates 1102 and 1103, if the value of the ratio $r_{1,1}$ of the inter-joint distances of the posture candidate 1102 is not within the above range, h(1, 1)=0 is provided. Further, if the value of the ratio $r_{2,1}$ of the inter-joint distances of the posture candidate 1103 is within the above range, h(2, 1)=1 is provided.

All the ratios of the inter-joint distances described on the table 1001 are evaluated by the above evaluation method of the ratio of the inter-joint distances, and the evaluation value f(a) is calculated by the following expression (17).

$$f(a) = c_i \prod_{j=1}^{J} h(i, j) \quad (17)$$

Here, the symbol $c_i$ in the expression (17) indicates the score of the posture candidate i, and the relevant score $c_i$ is multiplied by the result of the evaluation of the ratio of the inter-joint distances. By the expression (17), the evaluation value of the posture candidate which satisfies all the conditions of the ratio of the inter-joint distances is maintained, whereas the evaluation value of the posture candidate which does not satisfy any one of the conditions of the ratio of the inter-joint distances is provided as "0". The above evaluation is applied to all the posture candidates, and the posture candidate which finally has the highest evaluation value is selected as the final posture.

Further, in case of evaluating the ratio of the inter-joint distances, it is possible to change the method of calculating the evaluation value. In that case, the ratio $r_{i,1}$ of the inter-joint distances is calculated by, for example, the expression (15), and the evaluation value f(a) is calculated using the following expressions (18) and (19).

$$h(i, j) = 1 \quad \text{if } r_j - r_f \leq r_{i,j} \leq r_j + r_f \quad (18)$$
$$h(i, j) = -1 \quad \text{else}$$

$$f(a) = c_i + \sum_{j=1}^{J} w_j h(i, j) \quad (19)$$

Here, the symbol $w_j$ in the expression (19) indicates the weight to be added to the evaluation expression of each ratio of the inter-joint distances, and the relevant weight may previously be determined by the learning. Thus, it is possible to select, as the final posture, the posture candidate of which the calculated evaluation value f(a) is highest.

<Speeding Up of Consistency Evaluation>

In the above example, for all the posture candidates, since the evaluation values are respectively obtained by calculating all the ratios of the inter-joint distances, the process takes much time. Under the circumstances, it is possible to sequentially evaluate and determine each ratio of the inter-joint distances with respect to the posture candidate. In this case, if the value of h(i, j) is "0" in the expression (16), then the evaluation value f(a) is "0". Thus, it is possible to speed up the process as a whole, by stopping the subsequent process for the relevant posture candidate.

First, the order of the evaluation expressions of the ratios of the inter-joint distances illustrated in FIG. 10 is set. More specifically, the order is set so as to start the evaluation from one of which the width between the maximum and minimum values with respect to the ratio of the inter-joint distances obtained in the learning is smaller, or one of which the standard deviation for the average value is smaller.

Next, the ratio $r_{i,j}$ of the inter-joint distances is calculated with respect to the posture candidate i in the set order. Then, if the value of h(i, j) in the expression (16) is "0", it is decided that, with respect to the posture candidate i, the ratio of the inter-joint distances is not consistent with the human body model. In this case, it is possible to stop the subsequent process by substituting "0" for the evaluation value f(a). It is hereby possible to perform the evaluation of the posture candidate at high speed, by starting the evaluation, in the various human body models included in the learning data, from the ratio of the inter-joint distances having a small variation and then stopping the subsequent evaluation process for the posture candidate having a large variation.

Eighth Embodiment

In the present embodiment, a method of estimating the joint position permissible range information suitable for a certain individual from the plurality of posture estimation results obtained in the consistency evaluation, and evaluating the consistency using the estimated joint position permissible range information will be described.

<Constitution and Outline>

Figure 12:
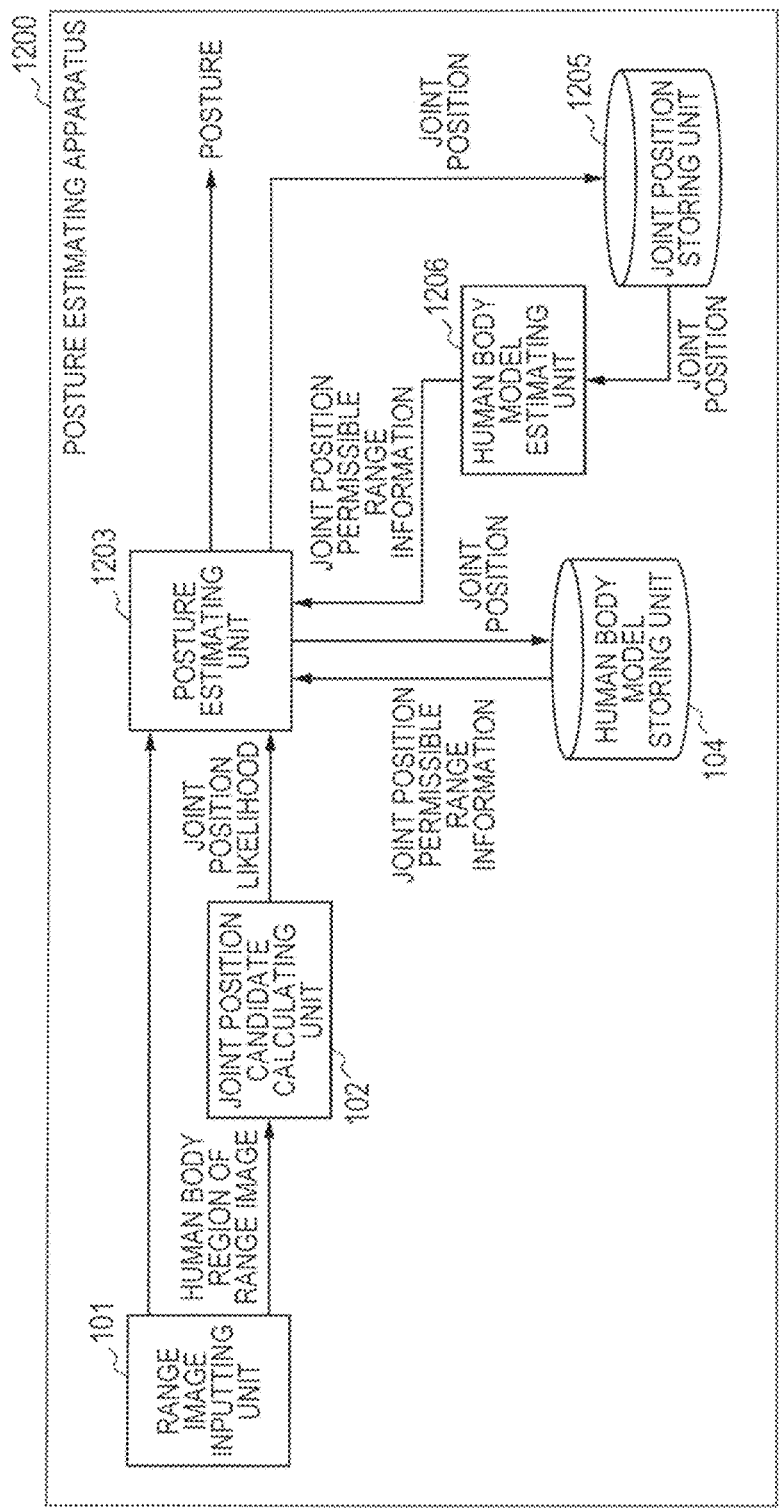
FIG. 12 is a block diagram illustrating a constitutional example of a posture estimating apparatus according to an eighth embodiment of the present invention.
Figure 13:
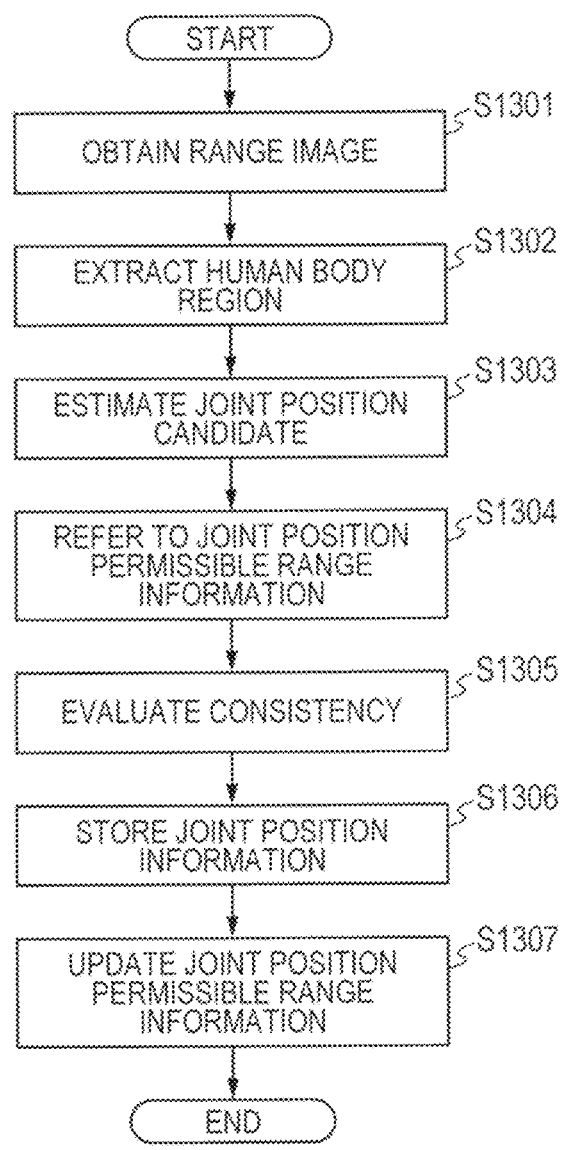
FIG. 13 is a flow chart for describing an example of a processing procedure for estimating joint position permissible range information according to a human body.

FIG. 12 is a block diagram illustrating a constitutional example of a posture estimating apparatus 1200 according to the present embodiment, and FIG. 13 is a flow chart for describing an example of a processing procedure for estimating the joint position permissible range information of the individual.

The posture estimating apparatus 1200 illustrated in FIG. 12 is equipped with a range image inputting unit 101, a joint position candidate calculating unit 102, a posture estimating unit 1203, a human body model storing unit 104, a joint position storing unit 1205 and a human body model estimating unit 1206. Incidentally, since the range image inputting unit 101, the joint position candidate calculating unit 102 and the human body model storing unit 104 are the same as those respectively illustrated in FIG. 1, the descriptions thereof are omitted here. Moreover, since the processes in S1301 to S1303 of FIG. 13 are the same as those in S201 to S203 respectively illustrated in FIG. 2, the descriptions thereof are omitted here.

The posture estimating unit 1203 evaluates the joint position candidate obtained by the joint position candidate calculating unit 102, with use of the human body model obtained from the human body model storing unit 104 or the human body model estimating unit 1206, and then estimates the final posture based on the evaluation. Besides, the posture estimating unit 1203 performs processes in later-described S1304 and S1305 of FIG. 13.

The joint position storing unit 1205 stores joint position information including the posture of the human body output by the posture estimating unit 1203, and performs a process in later-described S1306 of FIG. 13. Incidentally, the stored joint position information is then output to the human body model estimating unit 1206.

The human body model estimating unit 1206 obtains the joint position information output from the joint position storing unit 1205, and estimates the joint position permissible range information of the human body model based on the obtained joint position information. For example, the human body model estimating unit performs a process in later-described S1307 of FIG. 13. Here, as the joint position permissible range information to be estimated, there is the inter-joint distance of the multi-joint object model or the ratio of the inter-joint distances. Further, as the method of estimating the joint position permissible range information, there is a method of obtaining the inter-joint distance or the ratio of the inter-joint distances, by applying least square or probabilistic gradient descent to the joint position information output from the joint position storing unit 1205. Incidentally, in the present embodiment, it should be noted that the joint position permissible range information of the human body model to be estimated and the method of estimating the joint position permissible range information are not limited to those described above.

<Online Learning of Human Body Model>

Initially, the method in S1307 of FIG. 13 will be described. In this method, the human body model estimating unit 1206 estimate the human body model which is necessary when the posture estimating unit 1203 evaluates the consistency as the human body, on the basis of the joint position information obtained in chronological order.

First, the joint position information stored in the joint position storing unit 1205 is obtained. The joint position information concerning the postures output by the posture estimating unit 1203 up to now has been stored in the joint position storing unit 1205. Then, with respect to the posture of the joint position information obtained from the joint position storing unit 1205, the joint position permissible range information of the human body model to be used in the posture estimating unit 1203 is calculated. Here, it is possible to use the inter-joint relations same as those indicated on the table 312 illustrated in FIG. 3. Moreover, it is possible for the calculation expression for the ratio of the inter-joint distances to use the table 1001 illustrated in FIG. 10 or another table.

Next, the method of estimating the joint position permissible range information will be described. More specifically, the method of estimating the joint position permissible range information by using as the learning data the plurality of kinds of joint position information stored in the joint position storing unit 1205 and using the probabilistic gradient descent will be described in the present embodiment. Here, the method of estimating the joint position permissible range information is not limited to the probabilistic gradient descent, and it is possible to use another proper method.

Figure 14:
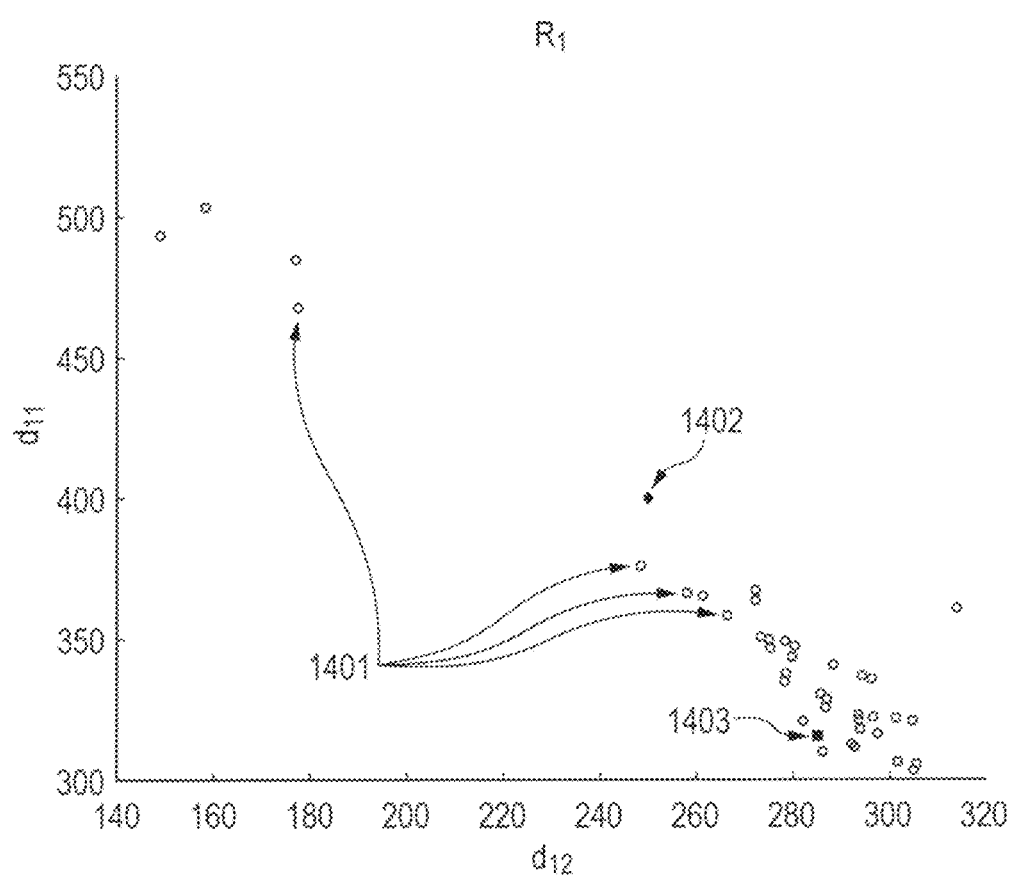
FIG. 14 is a diagram for describing a procedure for estimating the joint position permissible range information from a plurality of joint position information.

FIG. 14 is a diagram for describing relation of two inter-joint distances. In FIG. 14, white-circle coordinates 1401 indicate, in the joint position information stored in the joint position storing unit 1205, the coordinates constituted by the inter-joint distance $d_{11}$ between the joints $J_{11}$ and $J_{12}$ and the inter-joint distance $d_{12}$ between the joints $J_{12}$ and $J_{13}$ in FIG. 3.

First, a black-rhombic arbitrary coordinate 1402 is set with respect to the inter-joint distances $d_{11}$ and $d_{12}$. At this time, it is possible to select one of the coordinates 1401 of the inter-joint distances, or set the arbitrary coordinate at random. Then, the initial arbitrary coordinate 1402 of the inter-joint distances set as above is updated by the following expression (20).

$$d_j = d_j - \eta_i \nabla E_i, \ i=1, \ldots, N \quad (20)$$

By the expression (20), the inter-joint distance $d_j$ is updated by calculating the difference values from the inter-joint distance $d_j$ for an arbitrary number of data among N data of the coordinates 1401 of the inter-joint distances being the learning data and obtaining the difference from the value obtained by multiplying the difference value by the learning coefficient $\eta_i$. The relevant update is repeated until the set the convergence condition (for example, the value of the norm of $\nabla E_i$ is equal to or smaller than $10^{-4}$) is satisfied, or is ended in a case where the update process is performed up to the designated number of times before the convergence condition is satisfied. At this time, it is possible as $\nabla E_i$ to calculate the difference value between the inter-joint distance $d_j$ and the i-th data of the arbitrarily selected joint position information, or to calculate the square of the difference value. Besides, it is possible to use a fixed value as the learning coefficient $\eta_i$, or change the learning coefficient $\eta_i$ so as to decrease according to the number of times of update.

A black-square coordinate 1403 illustrated in FIG. 14 is equivalent to the coordinates of the inter-joint distances ($d_{11}$, $d_{12}$) obtained by updating the coordinate 1402 of the inter-joint distances by the expression (20). Incidentally, it is possible to obtain the ratio of the inter-joint distances by calculating $r_1 = d_{11}/d_{12}$. Then, the inter-joint distances ($d_{11}$, $d_{12}$) and the ratio $r_1$ of the inter-joint distances obtained by the update are output to the posture estimating unit 1203 as the individual joint position permissible range information. Likewise, as indicated by the table 1001, the joint position permissible range information of the human body model is estimated and output by learning also other inter-joint distances and other ratios of inter-joint distances. Thus, it is possible to obtain the joint position permissible range information of the human body which is in conformity with the figure of the individual.

<Evaluation of Consistency>

Hereinafter, only the newly added portions will be described. Initially, in S1304 of FIG. 13, the posture estimating unit 1203 obtains the range image obtained from the range image inputting unit 101 and the joint position candidate estimated by the joint position candidate calculating unit 102. Then, in S1305, the posture estimating unit evaluates the consistency of the human body by using the joint position permissible range information stored in the human body model storing unit 104. Incidentally, in an early stage, since the joint position permissible range information is not estimated by the human body model estimating unit 1206, the evaluation method to be used is the same as that described in the previous embodiment, and thus the final posture is estimated. In S1306, the estimated posture is output to the joint position storing unit 1205 as the joint position information. The above process is repeatedly performed. Then, if a certain time passes or the joint position information corresponding to the designated number of frames is stored in the joint position storing unit 1205, the learning of the human body model is performed by the human body model estimating unit 1206, and the joint position permissible range information is estimated.

If it comes to be able to obtain the joint position permissible range information from the human body model estimating unit 1206, the posture estimating unit 1203 evaluates the consistency of the joint position candidate using the joint position permissible range information obtained from the human body model estimating unit 1206. At this time, with respect to the joint position permissible range information and the inter-joint angle to be used for deciding the overlap of the joint positions, the consistencies thereof are evaluated by continuously obtaining them from the human body model storing unit 104. Moreover, even after the use of the joint position permissible range information obtained from the human body model estimating unit 1206, it is possible to store the joint position information output from the posture estimating unit 1203 in the joint position storing unit 1205. Thus, it is possible to sequentially estimate the joint position permissible range information by the human body model estimating unit 1206.

Further, in case of evaluating the consistency, it is possible, by using the joint position permissible range information estimated by the human body model estimating unit 1206, to calculate the evaluation value of the joint position using the expression (2). Besides, it is possible to calculate the evaluation value of the ratio of the inter-joint distances using the expressions (16) and (17). At this time, it is possible to use an arbitrary value as each of the certain ranges $d_f$ and $r_f$. Alternatively, it is possible to obtain the certain range from the maximum value, the minimum value, the average value, the standard deviation or the like of the coordinate 1403 of the joint position information of the learning data used in the learning.

Besides, the posture estimating unit 1203 can compare the joint position permissible range information estimated by the human body model estimating unit 1206 with the joint position permissible range information stored in the human body model storing unit 104, and decide based on the comparison result which joint position permissible range information is to be used. In the decision, for example, it is further decided whether the joint position permissible range information estimated by the human body model estimating unit 1206 is held within the range of the joint position permissible range information stored in the human body model storing unit 104. Incidentally, the decision method is not limited to that described above. Then, if it is decided that the joint position permissible range information estimated by the human body model estimating unit 1206 has been sufficiently learned, then it is possible to change over the joint position permissible range information to be used to that estimated by the human body model estimating unit 1206.

In addition, it is possible to evaluate the consistency of the overlap of the inter-joint angle and the joint and the consistency with the range image in parallel, using the joint position permissible range information stored in the human body model storing unit 104 as in the above embodiment. After the posture estimation process ended as a whole, it is possible to discard the joint position permissible range information estimated by the human body model estimating unit 1206. As described above, by estimating the joint position permissible range information by the learning based on the joint position information obtained from the posture estimating unit 1203, it is possible to estimate the posture by using the joint position permissible range information which is in conformity with the figure of the individual.

<Speeding Up of Consistency Evaluation>

In the above example, since the evaluations are performed with respect to all the joint combinations, the process takes much time. Under the circumstances, it is possible to speed up the process as a whole by the method same as that in the first or seventh embodiment. In the present embodiment, the consistency is evaluated by the method same as that in the first or seventh embodiment, except for the point that the joint position permissible range information is obtained from the human body model estimating unit 1206. Thus, it is possible to use the human body model in which the figure of the individual is reflected, and it is thus possible to estimate the posture with a higher degree of accuracy.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

By the posture estimating apparatus according to the present invention, since it is possible to improve accuracy of the posture in the local portion, it is possible to estimate the more consistent posture.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2013-157974, filed Jul. 30, 2013, Japanese Patent Application No. 2014-024716, filed Feb. 12, 2014, and Japanese Patent Application No. 2014-097829, filed May 9, 2014 which are hereby incorporated by reference herein in their entirety.

What is claimed is:

1. A posture estimating apparatus comprising:
at least one processor and memory coupled to each other and configured to:
  input a range image including a multi joint object;
  derive at least one joint position candidate for each of a first joint position and a second joint position of the multi-joint object, from the input range image;
  store information including joint position permissible range information for a first joint and a second joint in a multi-joint object model corresponding to the multi-joint object;
  calculate joint position range information for each combination of at least one joint position candidate set to the first joint position of the multi-joint object and at least one joint position candidate set to the second joint position of the multi-joint object;
  evaluate consistency for each combination by determining whether the calculated joint position range information for each combination is within the joint position permissible range information of the first and second joint positions of the multi-object model;
  calculate an evaluation value based on likelihoods of the joint position candidates and the evaluated consistencies for all combinations; and
  estimate a posture of the multi joint object based on the calculated evaluation value.

2. The posture estimating apparatus according to claim 1, wherein the at least one processor and the memory are further configured to:
  store the joint position permissible range information including at least one of a distance and an angle between the first joint in the multi joint object model corresponding to the multi-joint object and the second joint, and
  estimate the posture of the multi joint object by combining derived joint position candidates based on the joint position permissible range information including at least one of the distance and the angle.

3. The posture estimating apparatus according to claim 2, wherein a distribution of the distances and the angles between the first joint and the second joint is a normal distribution or a uniform distribution.

4. The posture estimating apparatus according to claim 1, wherein the at least one processor and the memory are further configured to estimate a multi joint object model similar to the multi joint object, and obtain stored information corresponding to the estimated multi-joint object model.

5. The posture estimating apparatus according to claim 1, wherein the at least one processor and the memory are further configured to:
store the joint position permissible range information including distances between the first joint and the second joint in a plurality of multi joint object models corresponding to the multi-joint object, and
estimate the posture of the multi joint object by combining derived joint position candidates based on the joint position permissible range information concerning the plurality of multi joint object models.

6. The posture estimating apparatus according to claim 1, wherein the at least one processor and the memory are further configured to:
derive a likelihood of a joint position candidate of the multi-joint object, and
estimate the posture of the multi joint object by combining joint position candidates of the multi joint object based on the derived likelihood.

7. The posture estimating apparatus according to claim 1, wherein the multi-joint object includes a human body.

8. The posture estimating apparatus according to claim 1, wherein the at least one processor and the memory are further configured to perform model fitting to the range image, using the estimated posture as an initial posture.

9. The posture estimating apparatus according to claim 1, wherein the at least one processor and the memory are further configured to:
evaluate a joint position candidate between adjacent joints, and
combine derived joint position candidates while narrowing to the joint position candidates to which evaluation results exceed a certain threshold.

10. The posture estimating apparatus according to claim 1, wherein the at least one processor and the memory are further configured to evaluate a position of the joint position candidate based on the input range image.

11. The posture estimating apparatus according to claim 1, wherein the at least one processor and the memory are further configured to evaluate consistency of arrangement of the joint positions of the multi-joint object by adding a joint position candidate which has a shield state.

12. The posture estimating apparatus according to claim 1, wherein the at least one processor and the memory are further configured to evaluate consistency between the input range image and the multi joint object model or a part of the multi joint object model.

13. The posture estimating apparatus according to claim 1, wherein the at least one processor and the memory are further configured to evaluate a positional overlap between the first joint in the multi joint object model corresponding to the multi-joint object and the second joint.

14. The posture estimating apparatus according to claim 1, wherein the at least one processor and the memory are further configured to use a plurality of evaluation values obtained by evaluating consistency of arrangement of the joint positions of the multi-joint object.

15. The posture estimating apparatus according to claim 1, wherein the at least one processor and the memory are further configured to:
store at least one piece of information of a ratio between a distance between the first joint and the second joint in the multi joint object model corresponding to the multi-joint object and a distance between joints other than the first joint and the second joint, and
estimate the posture of the multi-joint object further based on the at least one piece of information of the ratio.

16. The posture estimating apparatus according to claim 1, wherein the at least one processor and the memory are further configured to:
store at least one piece of information of a ratio between a sum of distances between at least two joints in the multi joint object model corresponding to the multi-joint object and a sum of distances between two joints other than the at least two joints, and
estimate the posture of the multi joint object based on the stored at least one piece of the information of the ratio.

17. The posture estimating apparatus according to claim 1, wherein the at least one processor and the memory further configured to estimate information including an arrangement relation between the first joint and the second joint, based on the estimated posture, and
wherein the at least one processor and the memory are further configured to estimate a posture in regard to another range image including the multi-joint object, based on a derived joint position candidate, in the another range image and the estimated information.

18. The posture estimating apparatus according to claim 17, wherein the at least one processor and the memory are further configured to estimate the information including the arrangement relation between the first joint and the second joint by learning an inter-joint distance of the multi-joint object.

19. The posture estimating apparatus according to claim 17, wherein the at least one processor and the memory are further configured to estimate the information including the arrangement relation between the first joint and the second joint by learning a ratio of two inter-joint distances in the multi-joint object.

20. The posture estimating apparatus according to claim 1, wherein the evaluation value for each combination is calculated by multiplying a likelihood of each joint position candidate in the combination by a corresponding weight to obtain a product and summing products for all joint position candidates in the combination,
wherein the corresponding weight is a value of 1 when the calculated joint position range information for the combination is within the joint position permissible range information of the first and second joint positions of the multi object model, and
wherein the corresponding weight is a value of 0 when the calculated joint position range information for the combination is not within the joint position permissible range information of the first and second joint positions of the multi object model.

21. A posture estimating apparatus comprising:
at least one processor and memory coupled to each other and configured to:
input a range image including a multi joint object;
derive at least one joint position candidate for each of a first joint position and a second joint position of the multi-joint object, from the input range image;
store information including joint position permissible range information for a first joint and a second joint in a multi-joint object model corresponding to the multi joint object;
calculate joint position range information for each combination of a plurality of joint position candidates set to the first joint position of the multi-joint object and at least one joint position candidate set to the second joint position of the multi-joint object;

evaluate consistency for each combination by determining whether the calculated joint position range information for each combination is within the joint position permissible range information of the first and second joint positions of the multi-object model;

calculate an evaluation value based on likelihoods of the joint position candidates and the evaluated consistencies for all combination;

estimate a posture of the multi joint object based on the calculated evaluation value;

store joint position information concerning the estimated posture; and estimate information including an arrangement relation between the first joint in the multi-joint object and a second joint from the stored joint position information, wherein, in a case where the information including the arrangement relation between the first joint in the multi-joint object and the second joint is estimated, the at least one processor and the memory are further configured to estimate the posture of the multi joint object based on the estimated information.

22. A posture estimating method for a posture estimating apparatus which stores information including a distance between a first joint in a multi joint object model corresponding to a multi-joint object and a second joint, the method comprising:

inputting a range image including the multi-joint object;

deriving at least one joint position candidate for each of a first joint position and a second joint position of the multi-joint object, from the input range image;

storing information including joint position permissible range information for the first joint and the second joint in the multi-joint object model corresponding to the multi-joint object;

calculating joint position range information for each combination of a plurality of joint position candidates set to the first joint position of the multi-joint object and at least one joint position candidate set to the second joint position of the multi-joint object;

evaluating consistency for each combination by determining whether the calculated joint position range information is within the joint position permissible range information of the first and second joint positions of the multi-object model;

calculating an evaluation value based on likelihoods of the joint position candidates and the evaluated consistencies for all combinations; and estimating a posture of the multi-joint object based on the calculated evaluation value.

23. A posture estimating method for a posture estimating apparatus which stores information including an arrangement relation between a first joint in a multi joint object model corresponding to a multi-joint object and a second joint, the method comprising:

inputting a range image including the multi-joint object;

deriving at least one joint position candidate for each of a first joint position and a second joint position of the multi-joint object, from the input range image;

storing information including joint position permissible range information for the first joint and the second joint in the multi-joint object model corresponding to the multi-joint object;

calculating joint position range information for each combination of a plurality of joint position candidates set to the first joint position of the multi-joint object and at least one joint position candidate set to the second joint position of the multi-joint object;

evaluating consistency for each combination by determining whether the calculated joint position range information for each combination is within the joint position permissible range information of the first and second joint positions of the multi-object model;

calculating an evaluation value based on likelihoods of the joint position candidates and the evaluated consistencies for all combinations;

estimating a posture of the multi joint object based on the calculated evaluation value;

storing joint position information concerning the estimated posture; and estimating information including an arrangement relation between the first joint in the multi-joint object and the second joint from the stored joint position information, wherein in a case where the information including the arrangement relation between the first joint in the multi-joint object and the second joint is estimated, the posture of the multi-joint object is estimated based on the estimated information.

24. A non-transitory computer-readable storing medium which stores a program for controlling a posture estimating apparatus which stores information including a distance between a first joint in a multi-joint object model corresponding to a multi-joint object and a second joint, the program causes a computer to execute:

inputting a range image including the multi-joint object;

deriving at least one joint position candidate for each of a first joint position and a second joint position of the multi-joint object, from the input range image;

storing information including joint position permissible range information for the first joint and the second joint in the multi-joint object model corresponding to the multi-joint object;

calculating joint position range information for each combination of a plurality of joint position candidates set to the first joint position of the multi-joint object and at least one joint position candidate set to the second joint position of the multi-joint object;

evaluating consistency for each combination by determining whether the calculated joint position range information for each combination is within the joint position permissible range information of the first and second joint positions of the multi-object model;

calculating an evaluation value based on likelihoods of the joint position candidates and the evaluated consistencies for all combinations; and estimating a posture of the multi joint object based on the evaluation value.

25. A non-transitory computer-readable storing medium which stores a program for controlling a posture estimating apparatus which stores information including an arrangement relation between a first joint in a multi-joint object model corresponding to a multi-joint object and a second joint, the program causes a computer to execute:

inputting a range image including the multi-joint object;

deriving at least one joint position candidate for each of a first joint position and a second joint position of the multi-joint object, from the input range image;

storing information including joint position permissible range information for the first joint and the second joint in the multi-joint object model corresponding to the multi-joint object;

calculating joint position range information for each combination of a plurality of joint position candidates set to the first joint position of the multi-joint object and at least one joint position candidate set to the second joint position of the multi-joint object;

evaluating consistency for each combination by determining whether the calculated joint position range information for each combination is within the joint position permissible range information of the first and second joint positions of the multi-object model;

calculating an evaluation value based on likelihoods of the joint position candidates and the evaluated consistencies for all combinations;

estimating a posture of the multi joint object based on the calculated evaluation value;

storing joint position information concerning the estimated posture; and estimating information including an arrangement relation between the first joint in the multi-joint object and the second joint from the stored joint position information, wherein in a case where the information including the arrangement relation between the first joint in the multi-joint object and the second joint is estimated, the posture of the multi-joint object is estimated based on the estimated information.

* * * * *